(12) United States Patent
Koga

(10) Patent No.: US 7,436,776 B2
(45) Date of Patent: Oct. 14, 2008

(54) COMMUNICATION TEST DEVICE

(75) Inventor: Yoshihiko Koga, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 729 days.

(21) Appl. No.: 10/875,433

(22) Filed: Jun. 24, 2004

(65) Prior Publication Data
US 2005/0099950 A1 May 12, 2005

(30) Foreign Application Priority Data
Nov. 10, 2003 (JP) ............................ 2003-379259

(51) Int. Cl.
H04J 1/16 (2006.01)
(52) U.S. Cl. .................. 370/246; 370/252; 370/394
(58) Field of Classification Search ................ 370/252, 370/265, 465, 466, 246, 467, 241, 394
See application file for complete search history.

(56) References Cited

U.S. PATENT DOCUMENTS

| | | | | |
|---|---|---|---|---|
| 5,257,311 A * | 10/1993 | Naito et al. | ................. | 370/244 |
| 5,969,833 A * | 10/1999 | Jensen | ........................ | 398/34 |
| 6,052,362 A * | 4/2000 | Somer | ....................... | 370/246 |
| 6,233,433 B1 * | 5/2001 | Norin | ...................... | 455/67.14 |
| 6,400,729 B1 * | 6/2002 | Shimadoi et al. | ............ | 370/466 |
| 6,728,214 B1 * | 4/2004 | Hao et al. | .................. | 370/241 |
| 6,914,878 B1 * | 7/2005 | Lindblom et al. | ........... | 370/219 |
| 2003/0081592 A1 * | 5/2003 | Krishnarajah et al. | ....... | 370/352 |
| 2004/0252717 A1 * | 12/2004 | Solomon et al. | ............ | 370/466 |
| 2007/0104105 A1 * | 5/2007 | MeLampy et al. | .......... | 370/235 |

FOREIGN PATENT DOCUMENTS

JP 2000-040041 2/2000

OTHER PUBLICATIONS

Transition mechanism for IPV6 host and routers by Gilligan et al., RFc 1933, Apr. 1996.*

* cited by examiner

Primary Examiner—Ricky Ngo
Assistant Examiner—Dady Chery
(74) Attorney, Agent, or Firm—Katten Muchin Rosenman LLP

(57) ABSTRACT

A communication test device for conducting a communication test on a repeater supporting two kinds of communication protocols. A sequential number attaching section attaches sequential numbers serially to both of first data frames conformable to a first communication protocol and second data frames conformable to a second communication protocol, which are randomly generated. A test data attaching section attaches test data to the first and second data frames, and a transmitting section transmits the first and second data frames to the repeater in order of the attached numbers. A sequential number judging section determines whether or not the first and second data frames have been received from the repeater in order of the numbers, and a test data comparing section compares the received test data with the test data attached by the test data attaching section.

14 Claims, 38 Drawing Sheets

FIG. 8
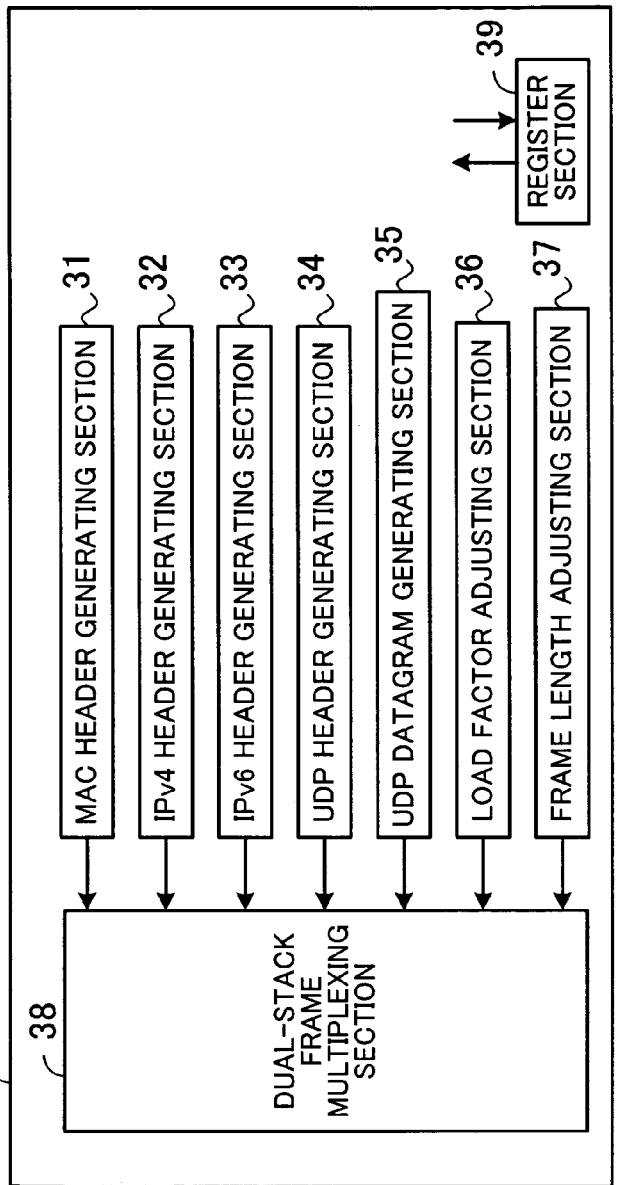
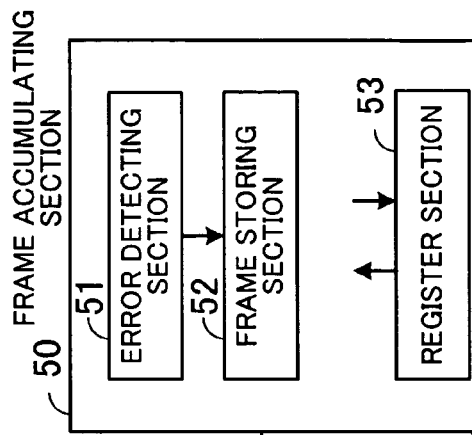
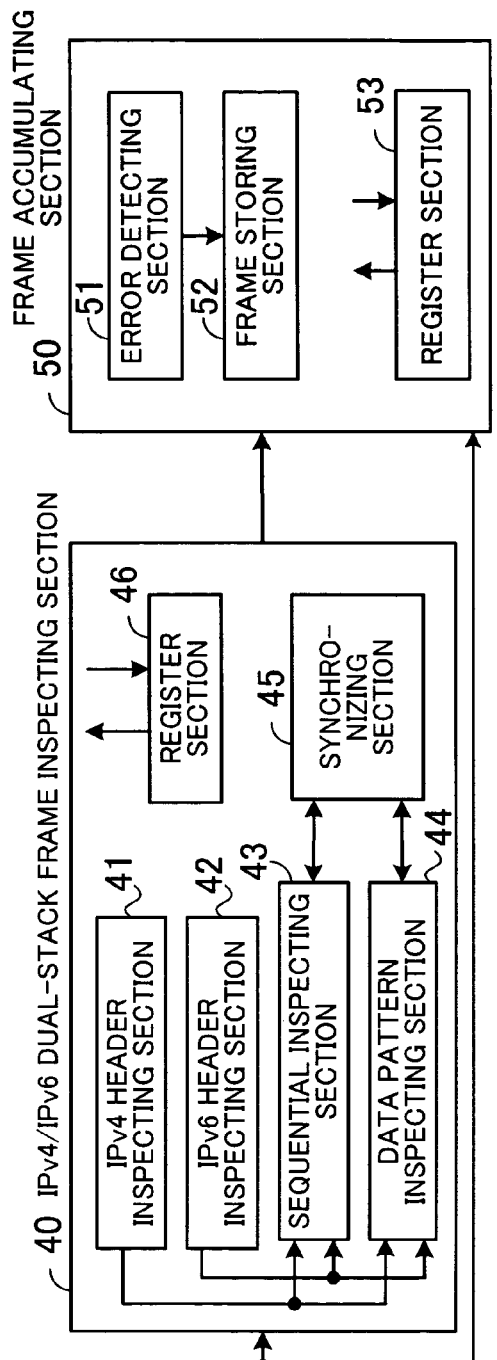
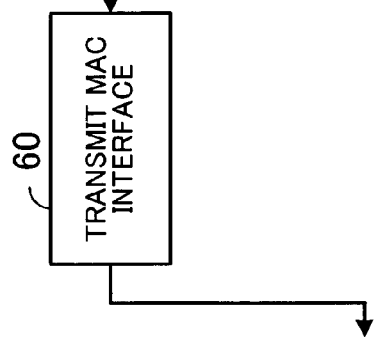
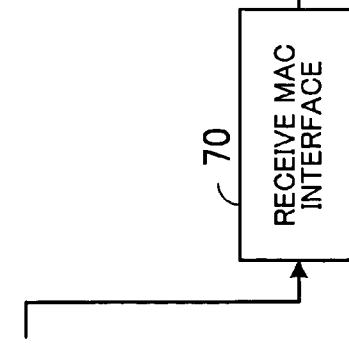

| Set value | No. of bits | Contents |
|---|---|---|
| Fixed value | 32 bits (in total) | Generated according to values set in register.<br>・TPID=16bits (Default: all "O")<br>・Prio. (Priority)=3bits (Default: all "O")<br>・CFI=1bits (Default: "O")<br>・VID=12bits (Default: all "O") |

| Set value | No. of bits | Contents |
|---|---|---|
| Fixed value | 16bits | Generated using fixed values set in hardware.<br>·IPv4→0x0800<br>·IPv6→0x86DD<br><br>*Not modifiable |

| Set value | Contents |
|---|---|
| Fixed value | Generated using fixed values set in hardware and calculated value.<br>•Ver. →0x6(4bits)<br>•Traffic_Class→0x00(8bits)<br>•Flow_Label[19:00]→0x00000(20bits)<br>•Payload_Length→Hardware calculated Value(16bits)<br>•Next_Header→0x11(8bits)<br>•Hop_Limit→0xFF(8bits) |

| Set value | No. of bits | Contents |
|---|---|---|
| Fixed value | 128bits | Generated according to values set in register. (Default) |
| Cyclic value | 128bits | Generated by incrementing within the following range: 0x00000000000000000000000000000000 ~0xFFFFFFFFFFFFFFFFFFFFFFFFFFFFFFFF |

| Set value | Contents |
|---|---|
| Fixed value | Generated using fixed values set in hardware and calculated value.<br>·Source_Port_No. →0x0000(16bits)<br>·Destination_Port_No. →0x0000(16bits)<br>·Length→Hardware calculated value(8bits)<br>·Checksum→0x0000(16bits) |

| Set value | No. of bits | Contents |
|---|---|---|
| Fixed value | 32bits | Generated according to value set in register. |

| Type | Contents |
|---|---|
| Bit error | Bit error is inserted in generated check data pattern. Error insertion position: Most significant bit (bit 31) of first word |
| Sequence error | Sequential no. is attached by skipping over one. |
| Duplication error | Identical sequential no. is attached twice consecutively. (Sequence error is also caused.) |

FIG. 21

| Set value | Contents |
|---|---|
| Fixed value | Generation ratio is determined according to values set in register. (Default)<br>(Example) Fixed values→IPv4=40%, IPv6=60% |
| Random value | IPv4-to-IPv6 generation ratio is randomly determined to generate data frames. |

FIG. 22

| Set value | Contents |
|---|---|
| Fixed value | Frames are generated with frame lengths adjusted according to values set in register. (Default) (Example) Fixed values→IPv4=64bytes, IPv6 =1518bytes |
| Random value | Frames are generated with IPv4 and IPv6 frame lengths randomized. |

| Operation | Contents |
|---|---|
| Inspection | IP_Ver. is compared with expected value (0x4). |
| In case of disagreement | •Data frame is discarded, judging that frame is not target to be inspected by present system.<br>•IP version error is written in register. |

| Operation | Contents |
|---|---|
| Inspection | Protocol is compared with expected value (0x11: UDP). |
| In case of disagreement | ·Data frame is discarded, judging that frame is not target to be inspected by present system.<br>·Protocol type error is written in register. |

| Operation | Contents |
|---|---|
| Inspection | Header_Checksum and checksum in IPv4 header are inspected. |
| In case of error | • Data frame is discarded, judging that frame is not target to be inspected by present system.<br>• Header_Checksum error is written in register. |

| Operation | Contents |
|---|---|
| Inspection | Ver. is compared with expected value (0x6). |
| In case of disagreement | •Data frame is discarded, judging that frame is not target to be inspected by present system.<br>•IP version error is written in register. |

| Operation | Contents |
|---|---|
| Inspection | Next_Header is compared with expected value (0x11: UDP). |
| In case of disagreement | ·Data frame is discarded, judging that frame is not target to be inspected by present system.<br>·Protocol type error is written in register. |

FIG. 29

| Operation | Contents |
|---|---|
| Inspection | Received PN_ID is compared with expected value (PN_ID generated at transmitting side). |
| In case of disagreement | • Data frame is discarded, judging that frame is not target to be inspected by present system.<br>• Frame ID error is written in register. |

| Error | Contents |
|---|---|
| Sequence error | Expected value of sequential no. is compared with sequential no. of received data frame.<br>[In case of error]<br>・Data frame is discarded, judging that check data pattern is not target of inspection.<br>・Sequence error is written in register. |
| Frame duplication error | Frame duplication error is detected if frames with identical sequential no. are received consecutively.<br>[In case of error]<br>・Data frame is discarded, judging that check data pattern is not target of inspection.<br>・Frame duplication error is written in register. |

| Pattern | Contents |
|---|---|
| Random | Expected value of PN (random) pattern is compared with pattern of received data frame.<br>· Generator polynomial: X31 + X28 + 1 (32-bit parallel processing)<br>[In case of error]<br>PN pattern bit error is written in register. |
| Fixed | Expected value of fixed data pattern is compared with pattern of received data frame.<br>[In case of error]<br>Fixed data pattern bit error is written in register. |
| Incremental | Expected value of incremental data pattern is compared with pattern of received data frame.<br>[In case of error]<br>Incremental data pattern bit error is written in register. |

| Contents |
|---|
| Sequential no. error |
| Check data pattern inspection error |

FIG. 38

COMMUNICATION TEST DEVICE

CROSS-REFERENCE TO RELATED APPLICATIONS

This application is based upon and claims the benefits of priority from the prior Japanese Patent Application No. 2003-379259, filed on Nov. 10, 2003, the entire contents of which are incorporated herein by reference.

BACKGROUND OF THE INVENTION (1) Field of the Invention

The present invention relates to a communication test device, and more particularly, to a communication test device for conducting a communication test on a repeater connected to networks.

(2) Description of the Related Art

Currently, IPv4 (Internet Protocol version 4) as a communication protocol is switching over to IPv6 (Internet Protocol version 6), in order to cope with an increasing number of Internet users. Thus, communication devices supporting IPv6 in general also support IPv4 (communication devices supporting both IPv6 and IPv4 are called IPv4/v6 dual stacks). The trend will last until IPv6 becomes widespread, and IPv4/v6 dual stacks are expected to be the next mainstream. In this connection, an input-output synchronization method for Internet protocol version conversion has been proposed which facilitates the switching of network protocol version numbers and also permits the communication with a computer whose version has been switched over to a new number as well as the use of new applications while maintaining the service of the original version (see Unexamined Japanese Patent Publication No. 2000-40041 (paragraph nos. [0017] to [0049], FIGS. 3 to 5), for example).

In order for IPv4/v6 dual-stack communication devices to be able to communicate using the communication protocol IPv6 or IPv4, it is essential that repeaters connected to networks, such as routers, switches and hubs, should be able to communicate in conformity with both the communication protocols IPv4 and IPv6. A translator technique or a tunneling technique (technique of tunneling IPv6 over IPv4) has therefore been adopted to enable repeaters to communicate in conformity with both the communication protocols IPv6 and IPv4.

Thus, repeaters supporting two kinds of communication protocols have come into use, and there has been a demand for communication test devices capable of conducting a communication test on repeaters supporting two different communication protocols.

SUMMARY OF THE INVENTION

The present invention was created in view of the above circumstances, and an object thereof is to provide a communication test device capable of testing a repeater supporting two kinds of communication protocols.

To achieve the object, there is provided a communication test device for conducting a communication test on a repeater connected to networks. The communication test device comprises data frame generating means for randomly generating first data frames conformable to a first communication protocol and second data frames conformable to a second communication protocol, sequential number attaching means for attaching sequential numbers to the first and second data frames consecutively, test data attaching means for attaching test data to the first and second data frames, transmitting means for transmitting the first and second data frames to the repeater in order of the attached numbers, receiving means for receiving the first and second data frames from the repeater, sequential number judging means for determining whether or not the first and second data frames have been received in order of the numbers, and test data comparing means for comparing the test data attached to the received first and second data frames with the test data attached by the test data attaching means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a functional block diagram of an FPGA;

FIG. 11 is a chart illustrating generation of a VLAN tag;

FIG. 12 is a chart illustrating generation of Frame_Type;

FIG. 15 is a chart illustrating generation of IPv6 header information;

FIG. 16 is a chart illustrating generation of IPv6 IP_DA;

FIG. 17 is a chart illustrating generation of a UDP header;

FIG. 18 is a chart illustrating generation of PN_ID;

FIG. 21 is a chart illustrating error insertion;

FIG. 22 is a chart illustrating setting of generation ratios;

FIG. 23 is a chart illustrating adjustment of frame lengths;

FIG. 25 is a chart illustrating version inspection of IPv4 header;

FIG. 26 is a chart illustrating protocol type inspection of IPv4 header;

FIG. 27 is a chart illustrating checksum inspection of IPv4 header;

FIG. 28 is a chart illustrating version inspection of IPv6 header;

FIG. 29 is a chart illustrating Next_Header inspection of IPv4 header;

FIG. 30 is a chart illustrating PN_ID inspection of UDP datagram;

FIG. 31 is a chart illustrating continuity inspection of data frame;

FIG. 33 is a chart illustrating check data pattern inspection;

FIG. 38 is a second chart illustrating error detection items.

DESCRIPTION OF THE PREFERRED EMBODIMENTS

The principle of the present invention will be described first with reference to the drawings.

Figure 1:
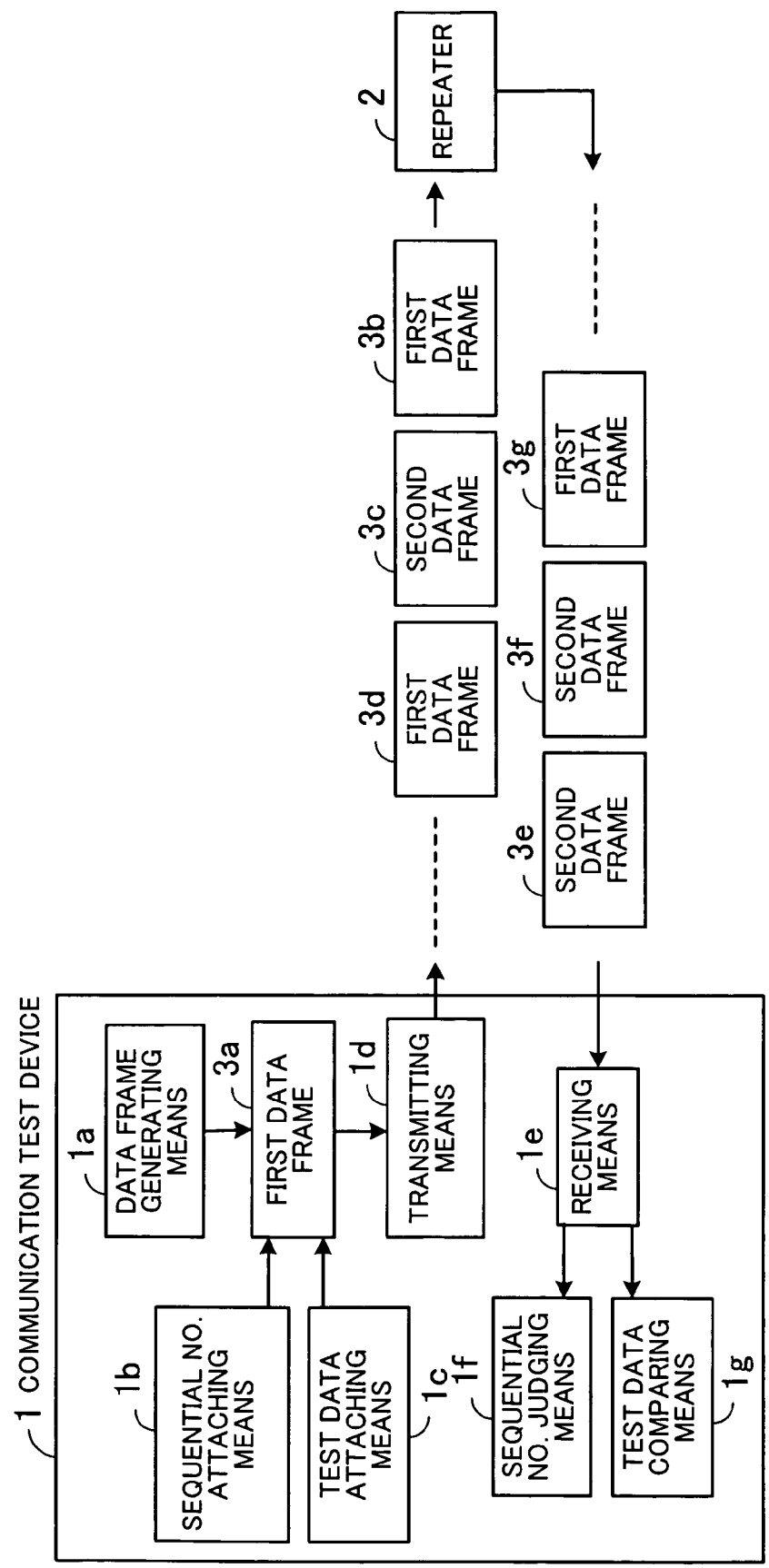
FIG. 1 is a diagram illustrating the principle of a communication test device according to the present invention.

FIG. 1 illustrates the principle of a communication test device according to the present invention.

As shown in FIG. 1, the communication test device 1 comprises data frame generating means 1a, sequential number attaching means 1b, test data attaching means 1c, transmitting means 1d, receiving means 1e, sequential number judging means 1f, and test data comparing means 1g. A repeater 2 is a device connected to networks for performing communication and comprises, for example, a router, switch or hub. The repeater 2 is capable of communicating both first data frames conformable to a first communication protocol and second data frames conformable to a second communication protocol. The communication test device 1 and the repeater 2 are interconnected by an optical cable or electric cable. FIG. 1 shows the first data frames 3a, 3b, 3d, 3g, . . . and the second data frames 3c, 3f, 3e, . . . exchanged between the communication test device 1 and the repeater 2.

The data frame generating means 1a randomly generates the first data frames conformable to the first communication protocol and the second data frames conformable to the second communication protocol.

The sequential number attaching means 1b attaches sequential numbers to the first and second data frames consecutively.

The test data attaching means 1c attaches test data to the first and second data frames.

The transmitting means 1d transmits the first and second data frames to the repeater 2 in order of the attached numbers. In FIG. 1, the sequential numbers are attached in order of the second data frames 3e and 3f, the first data frame 3g, . . . , the first data frame 3b, the second data frame 3c, the first data frame 3d, . . . , and the first data frame 3a.

The receiving means 1e receives the first and second data frames from the repeater 2.

The sequential number judging means 1f determines whether or not the first and second data frames have been received in order of the attached numbers.

The test data comparing means 1g compares the test data attached to the received first and second data frames with the test data attached by the test data attaching means 1c.

The repeater 2 connected to networks should, if operating normally, return (transmit) the first and second data frames to the communication test device 1 in the order in which the repeater received the frames from the test device 1. Also, the repeater should return the test data attached to the first and second data frames to the communication test device 1 while maintaining the original form free of, for example, data change.

Thus, normalcy of the repeater 2 can be judged by determining whether or not the first and second data frames are received in order of the attached numbers by the sequential number judging means 1f and by comparing the test data of the received first and second data frames with the test data attached by the test data attaching means 1c.

In this manner, the sequential numbers and the test data are attached to the first and second data frames conformable to the first and second communication protocols, respectively, and the data frames are transmitted to the repeater. Then, it is determined whether or not the first and second data frames have been received from the repeater in order of the attached numbers, and the received test data is compared with the original test data. This makes it possible to test the continuity of the first and second data frames received and transmitted by the repeater as well as the reliability of the data attached to the first and second data frames, whereby repeaters supporting two kinds of communication protocols can be tested.

A communication test device according to an embodiment of the present invention will be now described in detail with reference to the drawings.

Figure 2:
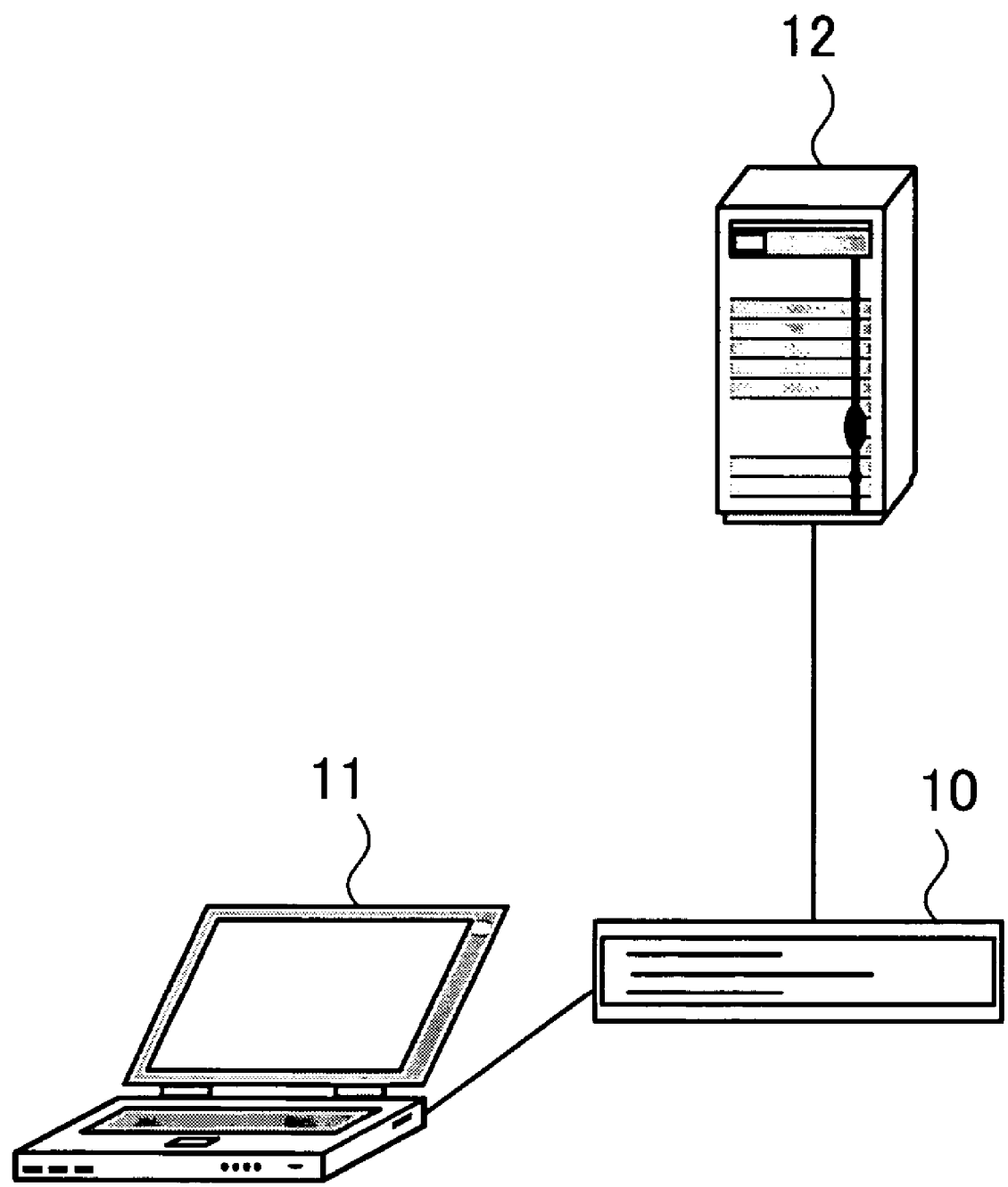
FIG. 2 is a diagram illustrating an exemplary application of the communication test device according to the present invention.

FIG. 2 illustrates an exemplary application of the communication test device according to the present invention.

As shown in FIG. 2, the communication test device comprises a body 10 and a console 11. The body 10 of the communication test device is connected to a repeater 12 by an optical cable or electric cable.

The repeater 12 is a target of testing and is an IPv4/v6 dual stack, for example, which is connected to the Internet and a LAN (Local Area Network) and capable of communication by using the communication protocols IPv4 and IPv6. The repeater 12 comprises, for example, a router, switch or hub.

The console 11 of the communication test device has a keyboard and a display. The console 11 receives tester's instructions through the keyboard and sends the instructions to the body 10. Also, the console 11 receives the results of a test conducted on the repeater 12 from the body 10 and displays the test results on the display. The console 11 comprises, for example, a personal computer.

The body 10 of the communication test device conducts a communication test on the repeater 12 in accordance with instructions from the console 11. The body 10 determines by the communication test whether or not the repeater 12 can properly communicate IPv4 and IPv6 data frames, and sends the results of the test conducted on the repeater 12 to the console 11.

In FIG. 2, the body 10 and console 11 of the communication test device are illustrated as separate devices but may be a single device.

A hardware configuration of the body 10 of the communication test device will be now described.

Figure 3:
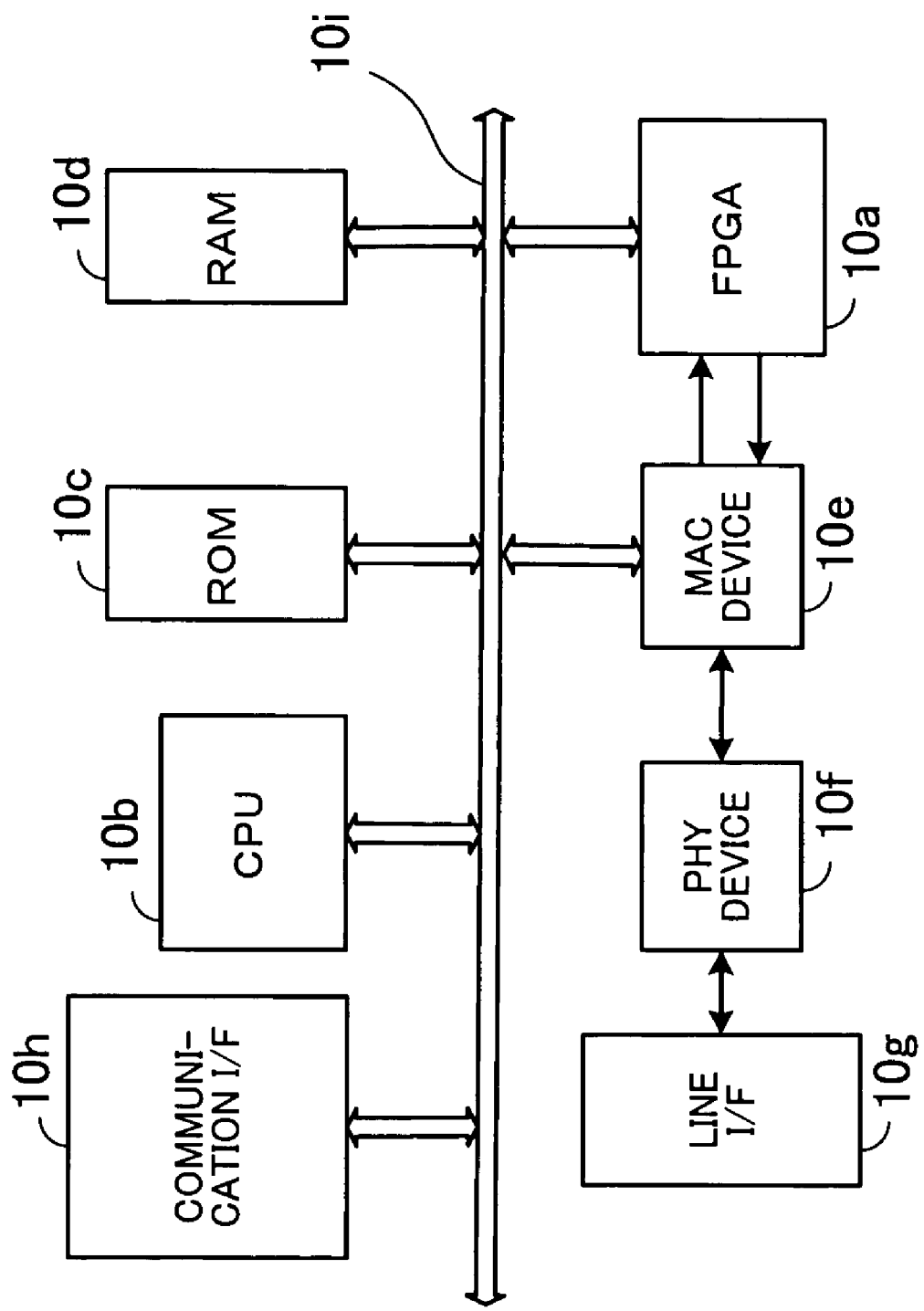
FIG. 3 is a block diagram showing the hardware configuration of a body of the communication test device.

FIG. 3 is a block diagram showing the hardware configuration of the body of the communication test device.

The body 10 is in its entirety under the control of a CPU 10b, and as illustrated, the CPU 10b is connected through a bus 10i with an FPGA (Field Programmable Gate Array) 10a, a ROM 10c, a RAM 10d, a MAC device 10e, and a communication I/F 10h. The MAC device 10e is connected with a PHY device 10f, to which is connected a line I/F 10g.

The RAM 10d temporarily stores OS (Operating System) programs and at least part of application programs executed by the CPU 10b. Also, the RAM 10d stores various other data necessary for the processing by the CPU 10b. The ROM 10c stores the OS and application programs as well as other data necessary for the processing.

The FPGA 10a has a circuit configured therein for performing the function of conducting a communication test on the repeater 12. The circuit configured in the FPGA 10a is reprogrammable so as to cope with modification or updating of the communication test. The FPGA 10a is connected to the MAC device 10e by a dedicated bus.

The MAC device 10e conforms to both of the communication protocols IPv4 and IPv6 and controls the MAC layer of data frames. The PHY device 10f also conforms to both the communication protocols IPv4 and IPv6 and controls the physical layer of data frames. The line I/F 10g is a line interface for Ethernet (registered trademark).

The communication I/F 10h is connected to the console 11 and comprises, for example, an RS232C interface. The CPU 10b exchanges data with the console 11 through the communication I/F 10h.

The processing function of the communication test device of the present invention can be performed by the hardware configuration described above.

The following describes data frames conformable to the communication protocols IPv6 and IPv4, respectively. First, a data frame conformable to the communication protocol IPv4 will be explained.

Figure 4:
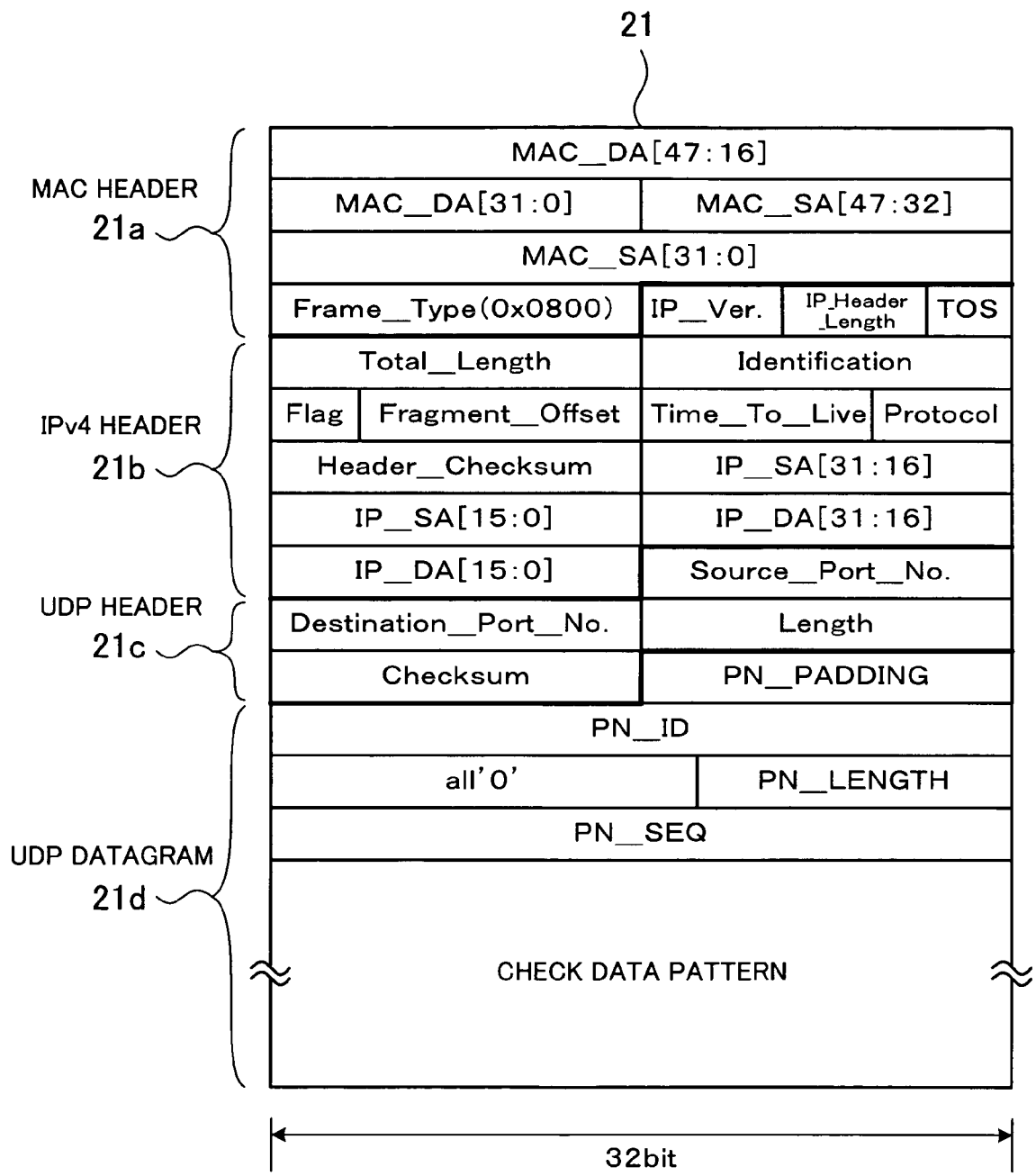
FIG. 4 is a chart showing the frame format of an IPv4 data frame.

FIG. 4 shows the frame format of an IPv4 data frame.

The data frame 21 shown in FIG. 4 is conformable to the communication protocol IPv4 and a part corresponding to the second to fourth layers of the OSI reference model is illustrated. The data frame 21 can be divided into a MAC (Media Access Control) header 21a, an IPv4 header 21b, a UDP (User Datagram Protocol) header 21c, and a UDP datagram 21d.

The MAC header 21a is constituted by MAC_DA indicating a destination MAC address, MAC_SA indicating a source MAC address, and Frame_Type indicating the type of data frame processed in the data link layer. MAC_DA and MAC_SA are each expressed by 48 bits. In Frame_Type is stored 0x0800 which indicates that the data frame 21 is conformable to IPv4.

The IPv4 header 21b is constituted by IP_Ver. indicating the IP version, IP_Header_Length indicating the length of the IPv4 header 21b, TOS indicating the quality of the data frame, Total_Length indicating the length of the data frame, Identification which is an identification value assigned by the transmitting side to assist the assembling of fragmented data frame, Flag used when fragmenting the data frame, Fragment_Offset indicating where in the original data the fragments of the data frame are located, Time_To_Live indicating a maximum time (number of routers that the data frame can pass through) for which the data frame can exist on the Internet, Protocol indicating the higher-layer protocol type, Header_Checksum indicating the checksum value of the IPv4 header 21b, IP_SA indicating the source IP address, and IP_DA indicating the destination IP address. IP_SA and IP_DA are each expressed by 32 bits. In IP_Ver. is stored 0x4 which is 4 bits long and indicative of IPv4.

The UDP header 21c is constituted by Source_Port_No. indicating the source port number, Destination_Port_No. indicating the destination port number, Length indicating the length of the UDP header 21c and UDP datagram 21d, and Checksum indicating the checksum value of the UDP header 21c and UDP datagram 21d.

The UDP datagram 21d is constituted by PN_PADDING which is used to guarantee that the data frame 21 ends with 32-bit boundary, PN_ID which is an identifier indicating that a check data pattern is test data, PN_LENGTH indicating the length of the check data pattern, PN_SEQ which is a sequential number attached in order to test continuity of the data frame 21, and the check data pattern used for determining whether or not the repeater 12 is receiving/transmitting data free of error.

An IPv4 data frame with a VLAN (Virtual Local Area Network) tag will be now described.

Figure 5:
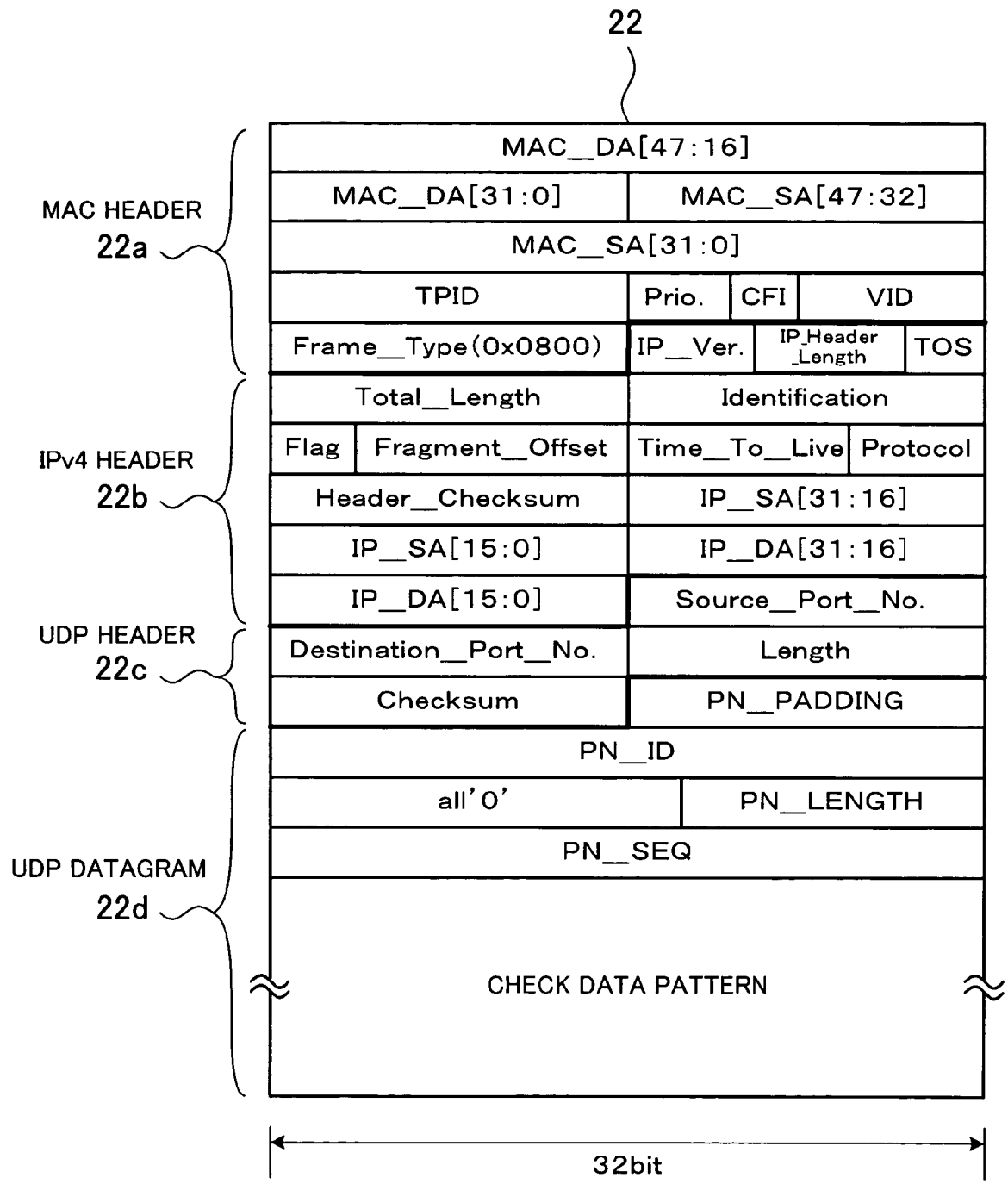
FIG. 5 is a chart showing the frame format of an IPv4 data frame with a VLAN tag.

FIG. 5 shows the frame format of an IPv4 data frame with a VLAN tag.

The data frame 22 shown in FIG. 5 is conformable to the communication protocol IPv4 and a part corresponding to the second to fourth layers of the OSI reference model is illustrated. The data frame 22 can be divided into a MAC header 22a, an IPv4 header 22b, a UDP header 22c, and a UDP datagram 22d.

In the MAC header 22a, TPID indicating that the data frame is a frame with a VLAN tag, Prio. indicating priority of switches, CFI indicating the display format of the format, and VID for identifying each VLAN are inserted between MAC_SA and Frame_Type.

The IPv4 header 22b, the UDP header 22c and the UDP datagram 22d are identical with the IPv4 header 21b, UDP header 21c and UDP datagram 21d shown in FIG. 4, respectively, and therefore, description thereof is omitted.

A data frame conformable to the communication protocol IPv6 will be now described.

Figure 6:
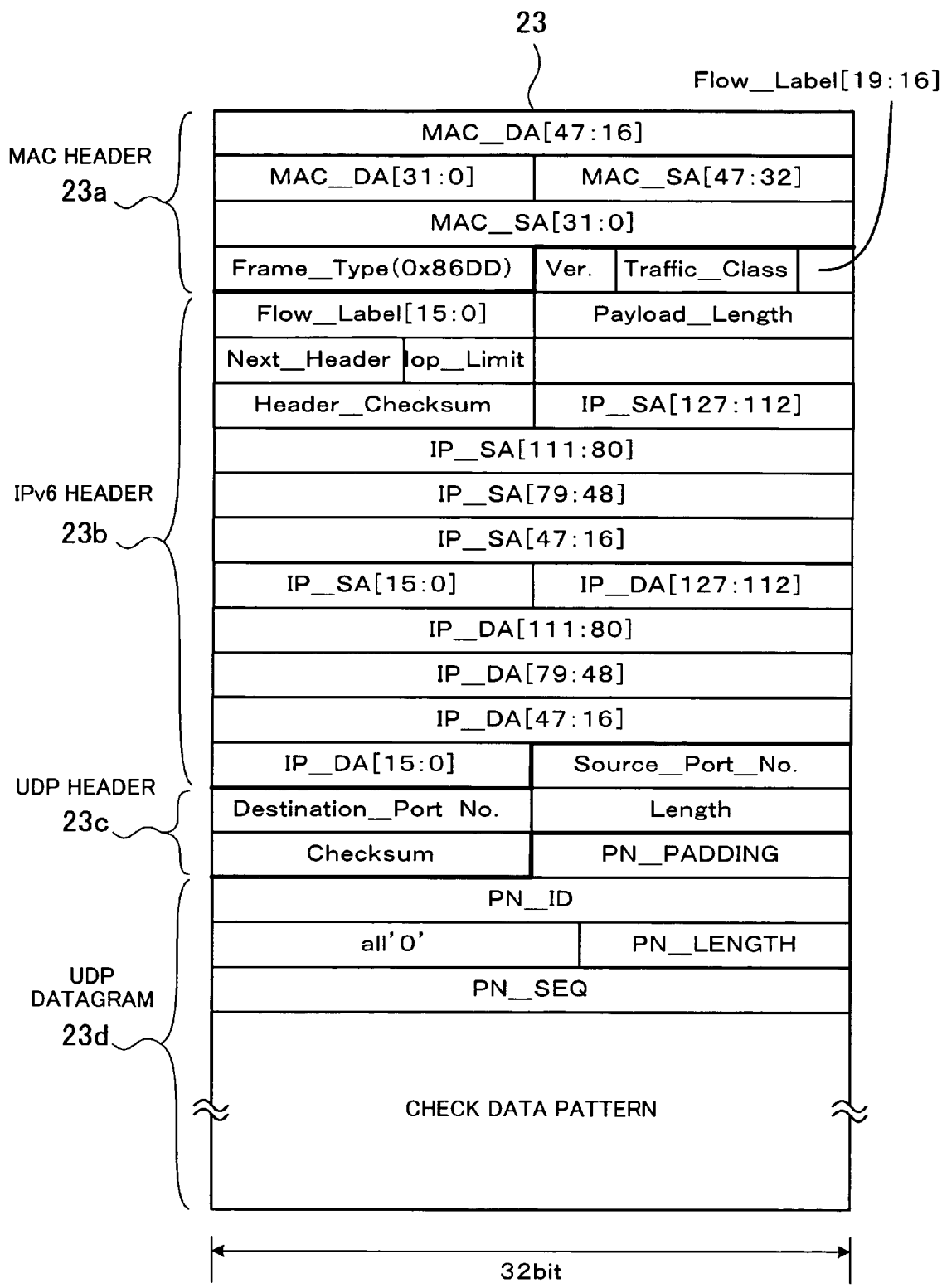
FIG. 6 is a chart showing the frame format of an IPv6 data frame.

FIG. 6 shows the frame format of an IPv6 data frame.

The data frame 23 shown in FIG. 6 is conformable to the communication protocol IPv6 and a part corresponding to the second to fourth layers of the OSI reference model is illustrated. The data frame 23 can be divided into a MAC header 23a, an IPv6 header 23b, a UDP header 23c, and a UDP datagram 23d.

The IPv6 header 23b is constituted by Ver. indicating the IP version, Traffic_Class indicating the quality of the data frame, Flow_Label specifying whether the data frame belongs to the same flow or not, Payload_Length indicating the length of a remaining data frame succeeding the header section, Next_Header indicating the type of the header succeeding the IPv6 header 23b, Hop_Limit storing a predetermined value which is decremented by 1 each time the data frame is transferred to the next node, Header_Checksum indicating the checksum value of the IPv6 header 23b, IP_SA indicating the source IP address, and IP_DA indicating the destination IP address. IP_SA and IP_DA are each expressed by 128 bits. In Ver. is stored 0x6 which is 4 bits long and indicative of IPv6.

The MAC header 23a, the UDP header 23c and the UDP datagram 23d are identical respectively with the MAC header 21b, UDP header 21c and UDP datagram 21d shown in FIG. 4, and thus description thereof is omitted. In Frame_Type of the MAC header 23a, however, 0x86DD indicating that the data frame 23 is conformable to IPv6 is stored.

An IPv6 data frame with a VLAN tag will be now described.

Figure 7:
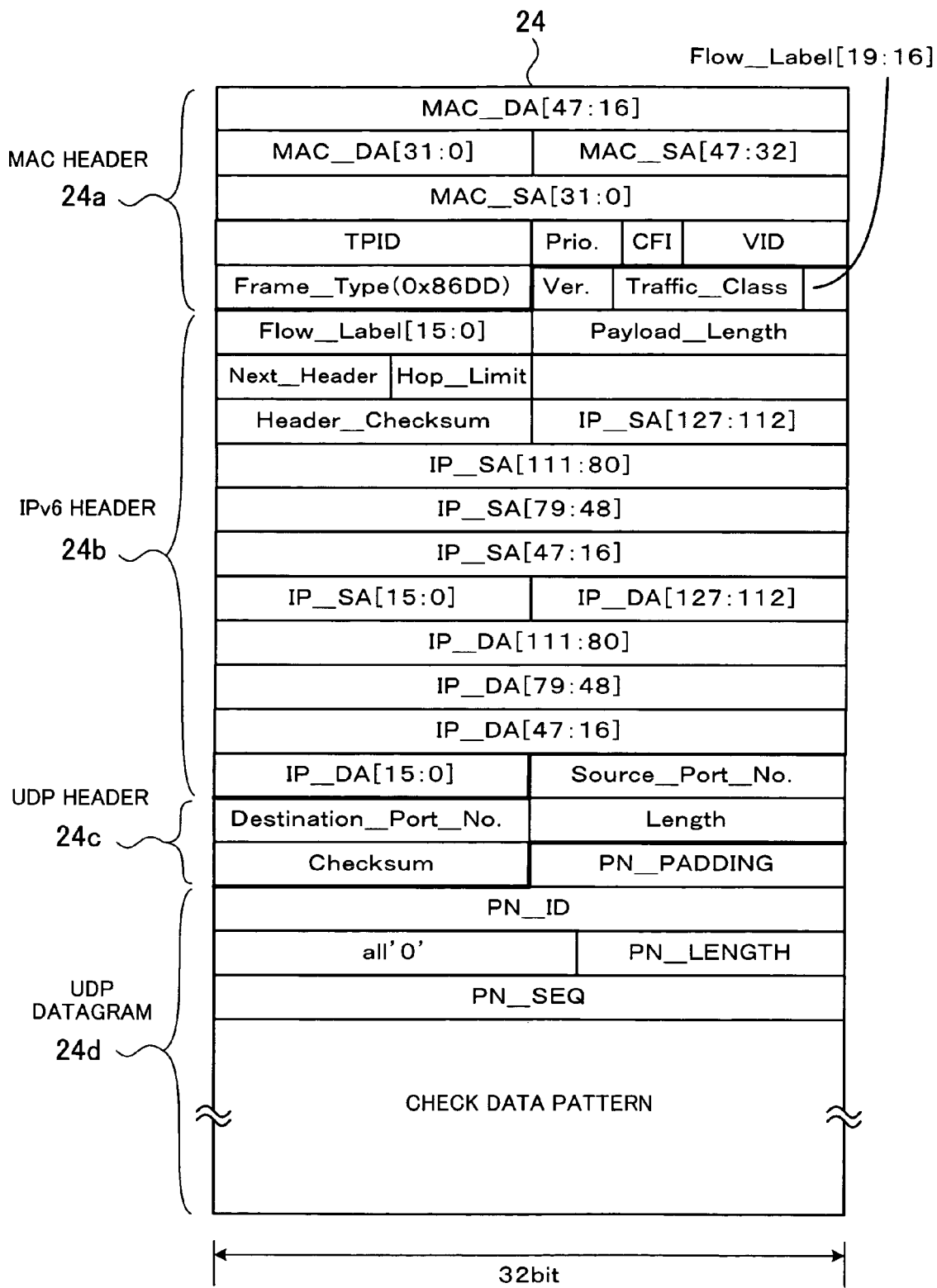
FIG. 7 is a chart showing the frame format of an IPv6 data frame with a VLAN tag.

FIG. 7 shows the frame format of an IPv6 data frame with a VLAN tag.

The data frame 24 shown in FIG. 7 is conformable to the communication protocol IPv6 and a part corresponding to the second to fourth layers of the OSI reference model is illustrated. The data frame 24 can be divided into a MAC header 24a, an IPv6 header 24b, a UDP header 24c, and a UDP datagram 24d.

In the MAC header 24a, TPID indicating that the data frame is a frame with a VLAN tag, Prio. indicating priority of switches, CFI indicating the display format of the format, and VID for identifying each VLAN are inserted between MAC_SA and Frame_Type.

The IPv6 header 24b, the UDP header 24c and the UDP datagram 24d are identical with the IPv6 header 23b, UDP header 23c and UDP datagram 23d shown in FIG. 6, respectively, and therefore, description thereof is omitted.

The following describes the function of the FPGA 10a in the body 10.

FIG. 8 is a functional block diagram of the FPGA.

As shown in FIG. 8, the FPGA 10a comprises an IPv4/IPv6 dual-stack frame generating section 30 for generating both IPv4 and IPv6 data frames, an IPv4/IPv6 dual-stack frame inspecting section 40 for inspecting data frames received from the repeater 12 to determine whether the data frames are proper or not, a frame accumulating section 50 for storing data frames preceding and following an improper data frame when a data frame is found improper, a transmit MAC interface 60 for transmitting generated data frames to the repeater 12 through the MAC device 10e, the PHY device 10f and the line I/F 10g, and a receive MAC interface 70 for receiving data frames from the repeater 12 through the line I/F 10g, the PHY device 10f and the MAC device 10e.

The IPv4/IPv6 dual-stack frame generating section 30 includes a MAC header generating section 31, an IPv4 header generating section 32, an IPv6 header generating section 33, a UDP header generating section 34, a UDP datagram generating section 35, a load factor adjusting section 36, a frame length adjusting section 37, a dual-stack frame multiplexing section 38, and a register section 39.

The register section 39 holds data set by the CPU 10b. Also, data is written into the register section 39 by the individual sections of the IPv4/IPv6 dual-stack frame generating section 30. The data written into the register section 39 is read out by the CPU 10b. The register section 39 includes a plurality of registers each for temporarily storing data.

The MAC header generating section 31 generates a MAC header in accordance with the data set in the register section 39. The IPv4 header generating section 32 generates an IPv4 header in accordance with the data set in the register section 39, and the IPv6 header generating section 33 generates an IPv6 header in accordance with the data set in the register section 39. The UDP header generating section 34 generates a UDP header in accordance with the data set in the register section 39. The UDP datagram generating section 35 generates a UDP datagram in accordance with the data set in the register section 39. Also, the UDP datagram generating section 35 generates a sequential number and a check data pattern (test data) and inserts the generated data in the UDP datagram.

In accordance with the data set in the register section 39, the load factor adjusting section 36 determines the overall generation rate (load factor) of IPv4 and IPv6 data frames to be generated by the dual-stack frame multiplexing section 38. The load factor is defined as a total number of IPv4 and IPv6 data frames generated in a second. If the load factor is large, for example, an increased number of data frames are transmitted to the repeater 12. Also, the load factor adjusting section 36 determines the ratio of generation of IPv4 data frames to IPv6 data frames in accordance with the data set in the register section 39. The generation ratio is determined such that IPv4 and IPv6 data frames account for 40% and 60%, respectively, of the total number of data frames to be generated, for example.

The frame length adjusting section 37 determines, in accordance with the data set in the register section 39, the frame lengths of IPv4 and IPv6 data frames to be generated by the dual-stack frame multiplexing section 38. For example, 64 bytes and 1518 bytes are determined as the frame lengths of IPv4 and IPv6 data frames, respectively.

The dual-stack frame multiplexing section 38 assembles the various headers and UDP datagram generated by the respective sections to generate IPv4 and IPv6 data frames. At this time, the dual-stack frame multiplexing section 38 generates IPv4 and IPv6 data frames so as to satisfy the load factor, generation ratio and frame lengths instructed by the load factor adjusting section 36 and the frame length adjusting section 37.

When generating an IPv4 data frame, for example, the dual-stack frame multiplexing section 38 assembles the MAC header generated by the MAC header generating section 31, the IPv4 header generated by the IPv4 header generating section 32, the UDP header generated by the UDP header generating section 34 and the UDP datagram generated by the UDP datagram generating section 35, to generate a data frame conformable to the communication protocol IPv4. When generating an IPv6 data frame, the dual-stack frame multiplexing section 38 assembles the MAC header generated by the MAC header generating section 31, the IPv6 header generated by the IPv6 header generating section 33, the UDP header generated by the UDP header generating section 34 and the UDP datagram generated by the UDP datagram generating section 35, to generate a data frame conformable to the communication protocol IPv6.

The IPv4/IPv6 dual-stack frame inspecting section 40 includes an IPv4 header inspecting section 41, an IPv6 header inspecting section 42, a sequential inspecting section 43, a data pattern inspecting section 44, a synchronizing section 45, and a register section 46.

The register section 46 holds data set by the CPU 10b. Also, data is written into the register section 46 by the individual sections of the IPv4/IPv6 dual-stack frame inspecting section 40. The data written into the register section 46 is read out by the CPU 10b. The register section 46 includes a plurality of registers each for temporarily storing data.

The IPv4 header inspecting section 41 inspects the MAC header, IPv4 header and UDP header of the IPv4 data frame received via the receive MAC interface 70. The IPv6 header inspecting section 42 inspects the MAC header, IPv6 header and UDP header of the IPv6 data frame received via the receive MAC interface 70.

The sequential inspecting section 43 detects PN_SEQ (sequential number) inserted in the UDP datagram of the received data frame. The sequential inspecting section 43 generates a sequential value as an expected value and compares the expected value with the sequential number detected from the received data frame. Also, the sequential inspecting section 43 determines whether or not the data frames are being received in order of the sequential numbers, and writes the results of determination in the register section 46.

The data pattern inspecting section 44 compares the check data pattern (test data) inserted in the UDP datagram of the received data frame with the check data pattern generated by the UDP datagram generating section 35. In this case, the data pattern inspecting section 44 compares the check data patterns on a bit-by-bit basis, the results of comparison being written into the register section 46.

If the sequential number of the received data frame differs from the corresponding expected value (if continuity error occurs), the synchronizing section 45 controls the sequential inspecting section 43 so that expected values may be generated thereafter starting from the value subsequent to the erroneous sequential number (resynchronization process). Alternatively, the synchronizing section 45 forcibly inspects the data frames without performing the resynchronization process (non-resynchronization process). The synchronizing section 45 performs the resynchronization process or the non-resynchronization process in accordance with the data set in the register section 46.

The CPU 10b reads out the results written in the register section 46 and transmits the read data to the console 11 through the bus 10i and the communication I/F 10h. The console 11 displays the received test results, whereby the tester can be informed of the results of the test conducted on the repeater 12.

The frame accumulating section 50 includes an error detecting section 51, a frame storing section 52, and a register section 53.

The register section 53 holds data set by the CPU 10b. Also, data is written into the register section 53 by the individual sections of the frame accumulating section 50. The data written into the register section 53 is read out by the CPU 10b. The register section 53 includes a plurality of registers each for temporarily storing data.

The error detecting section 51 stores the received data frames in the frame storing section 52 by FIFO (First In First Out) method. If a sequential number error or check data pattern error occurs, the error detecting section 51 keeps storing a predetermined number of data frames thereafter and then stops storing data frames in the frame storing section 52. Also, if the received data frame contains a prespecified error, the error detecting section 51 keeps storing the predetermined number of data frames thereafter and then stops storing data frames in the frame storing section 52. This permits the tester to learn the contents of data preceding and following the prespecified error as well as the contents of data frames preceding and following the erroneous data frame. The frame storing section 52 can be implemented by a built-in memory of the FPGA 10a or by the RAM 10d.

The following describes in detail the IPv4/IPv6 dual-stack frame generating section 30, IPv4/IPv6 dual-stack frame inspecting section 40 and frame accumulating section 50 appearing in FIG. 8. First, the IPv4/IPv6 dual-stack frame generating section 30 will be explained in detail.

Figure 9:
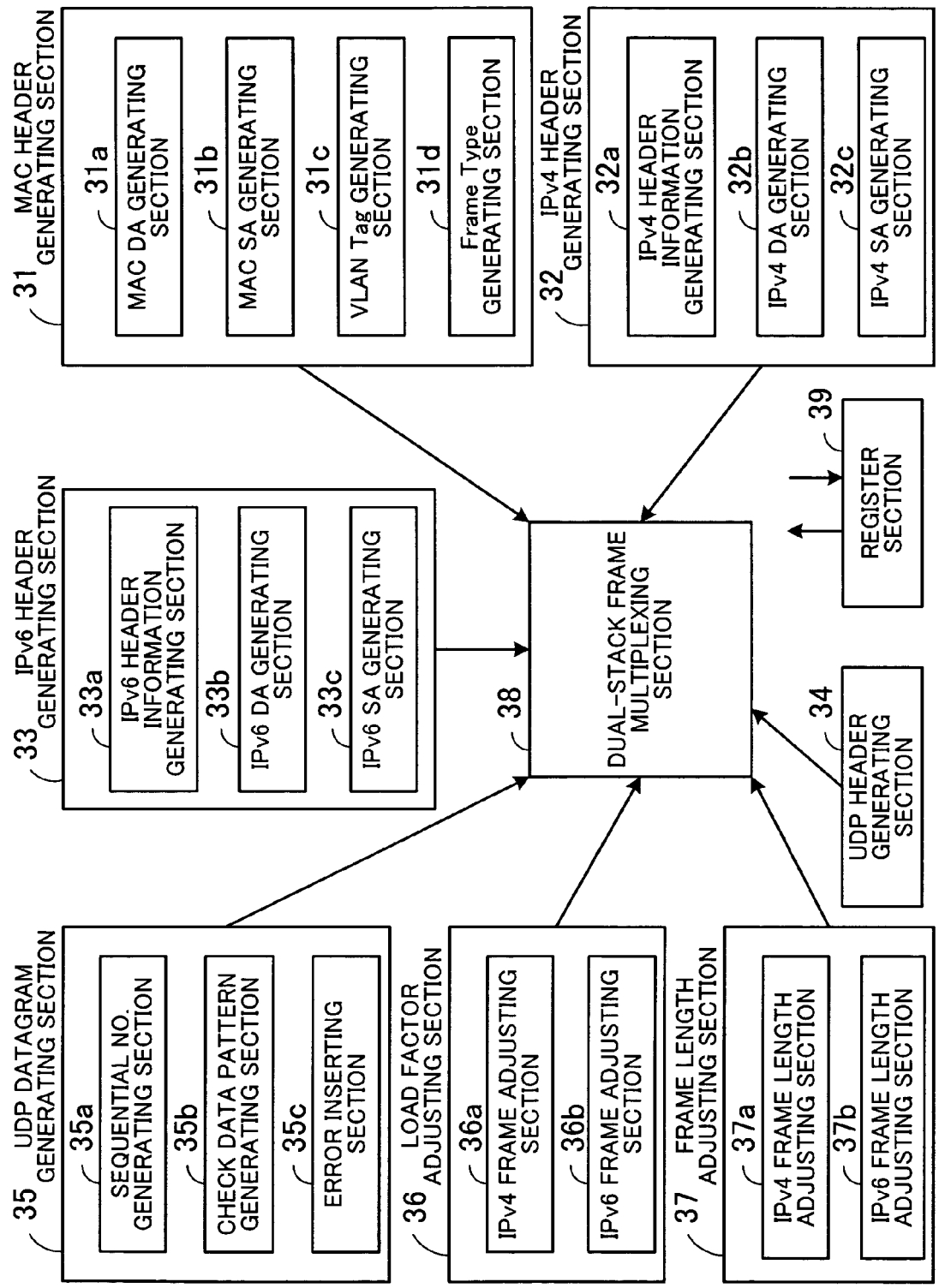
FIG. 9 is a detailed functional block diagram of an IPv4/IPv6 dual-stack frame generating section appearing in FIG. 8.

FIG. 9 is a detailed functional block diagram of the IPv4/IPv6 dual-stack frame generating section appearing in FIG. 8.

As shown in FIG. 9, the MAC header generating section 31 includes a MAC DA generating section 31a, a MAC SA generating section 31b, a VLAN Tag generating section 31c, and a Frame Type generating section 31d.

The MAC DA generating section 31a generates MAC_DA of the MAC header. In accordance with the data set in the register section 39, the MAC DA generating section 31a generates a fixed value or cyclic value as MAC_DA. The data set in the register section 39 is entered by the tester through the console 11.

Figure 10:
FIG. 10 is a chart illustrating generation of MAC_DA.

FIG. 10 illustrates generation of MAC_DA.

FIG. 10 shows a table 81 explaining the manner of generating a fixed value and a cyclic value, both as MAC_DA. As seen from the table 81, MAC_DA is expressed by 48 bits regardless of whether it is a fixed value or a cyclic value.

Where MAC_DA is fixed, the MAC DA generating section 31a can generate a plurality of fixed MAC_DA values. In this case, the MAC DA generating section 31a generates fixed MAC_DA values in accordance with values set in the register section 39. Where a cyclic value is generated as MAC_DA, the MAC DA generating section 31a generates a cyclic value by incrementing MAC_DA within the range shown in the cell associated with "Cyclic value" in the table 81.

The MAC SA generating section 31b generates MAC_SA of the MAC header. In accordance with the data set in the register section 39, the MAC SA generating section 31b generates a fixed value or cyclic value as MAC_SA. The data set in the register section 39 is entered by the tester through the console 11.

MAC_SA is expressed by 48 bits. Where MAC_SA is fixed, the MAC SA generating section 31b can generate a plurality of fixed MAC_SA values. In this case, the MAC SA generating section 31b generates fixed MAC_SA values in accordance with values set in the register section 39. Where a cyclic value is generated as MAC_SA, the MAC SA generating section 31b generates a cyclic value by incrementing MAC_SA within the same range as shown in the cell associated with "Cyclic value" in the table 81.

The VLAN Tag generating section 31c generates a VLAN tag of the MAC header in accordance with the data set in the register section 39. The VLAN tag is generated by the VLAN Tag generating section 31c only when the repeater 12 is a device supporting VLAN.

FIG. 11 illustrates generation of a VLAN tag.

FIG. 11 shows a table 82 explaining the manner of generating a VLAN tag. The VLAN tag value can be changed by modifying data set in the register section 39 and is a fixed value that remains unchanged until the data set in the register section 39 is modified.

As seen from the table 82, TPID of the VLAN tag is expressed by 16 bits, Prio. by 3 bits, CFI by 1 bit, and VID by 12 bits. Accordingly, the VLAN tag as a whole is expressed by a total of 32 bits. All of TPID, Prio., CFI and VID are generated using 0 (zero) by default.

The Frame Type generating section 31d generates Frame_Type of the MAC header. The Frame_Type value differs depending on whether the protocol is IPv4 or IPv6.

FIG. 12 illustrates generation of Frame_Type.

FIG. 12 shows a table 83 explaining the manner of generating Frame_Type. As seen from the table 83, Frame_Type is a fixed value expressed by 16 bits. For IPv4, 0x0800 is generated, and for IPv6, 0x86DD is generated. The fixed Frame_Type values admit of no change and are set in hardware as fixed values, for example.

Thus, in the MAC header generating section 31, MAC_DA of the MAC header is generated by the MAC DA generating section 31a, MAC_SA of the MAC header is generated by the MAC SA generating section 31b, a VLAN tag of the MAC header is generated by the VLAN Tag generating section 31c, and Frame_Type of the MAC header is generated by the Frame Type generating section 31d.

As shown in FIG. 9, the IPv4 header generating section 32 includes an IPv4 header information generating section 32a, an IPv4 DA generating section 32b, and an IPv4 SA generating section 32c.

The IPv4 header information generating section 32a generates header information of the IPv4 header. The header information includes IP_Ver., IP_Header_Length, TOS, Total_Length, Identification, Flag, Fragment_Offset, Time_To_Live, Protocol, and Header_Checksum. Also, the IPv4 header information generating section 32a generates IP_SA and IP_DA of the IPv4 header.

Figure 13:
FIG. 13 is a chart illustrating generation of IPv4 header information.

FIG. 13 illustrates generation of the IPv4 header information.

FIG. 13 shows a table 84 explaining the manner of generating the IPv4 header information. As seen from the table 84, IP_Ver. of the header information is expressed by 4 bits and 0x4 indicative of IPv4 is set therefor. IP_Header_Length is expressed by 4 bits and 0x5 is set therefor. TOS is expressed by 8 bits and 0x00 is set therefor. Total_Length represents the data frame length and is expressed by 16 bits. Identification is expressed by 16 bits and 0x0000 is set therefor. Flag is expressed by 3 bits and 0x0 is set therefor. Fragment_Offset is expressed by 13 bits and 0x000 is set therefor. Time_To_Live is expressed by 8 bits and 0x20 is set therefor. Protocol is expressed by 8 bits and 0x11 is set therefor.

Header_Checksum represents the checksum value of the IPv4 header and is expressed by 16 bits. The Total_Length value and the Header_Checksum value are calculated by hardware. The other values of the IPv4 header information are set in hardware as fixed values, for example.

The IPv4 DA generating section 32b generates IP_DA of the IPv4 header. In this case, the IPv4 DA generating section 32b generates a fixed value or cyclic value as IP_DA in accordance with the data set in the register section 39. The data set in the register section 39 is entered by the tester through the console 11.

Figure 14:
FIG. 14 is a chart illustrating generation of IPv4 IP_DA.

FIG. 14 illustrates generation of IPv4 IP_DA.

FIG. 14 shows a table 85 explaining the manner of generating a fixed value and a cyclic value, both as IP_DA. As seen from the table 85, IP_DA is expressed by 32 bits regardless of whether it is a fixed value or a cyclic value.

Where IP_DA is fixed, the IPv4 DA generating section 32b can generate a plurality of fixed IP_DA values. In this case, the IPv4 DA generating section 32b generates fixed IP_DA values in accordance with values set in the register section 39. Where a cyclic value is generated as IP_DA, the IPv4 DA generating section 32b generates a cyclic value by incrementing IP_DA within the range shown in the cell associated with "Cyclic value" in the table 85.

The IPv4 SA generating section 32c generates IP_SA of the IPv4 header. In accordance with the data set in the register section 39, the IPv4 SA generating section 32c generates a fixed value or cyclic value as IP_SA. The data set in the register section 39 is entered by the tester through the console 11.

IP_SA is expressed by 32 bits. Where IP_SA is fixed, the IPv4 SA generating section 32c can generate a plurality of fixed IP_SA values. In this case, the IPv4 SA generating section 32c generates fixed IP_SA values in accordance with values set in the register section 39. Where a cyclic value is generated as IP_SA, the IPv4 SA generating section 32c generates a cyclic value by incrementing IP_SA within the same range as shown in the cell associated with "Cyclic value" in the table 85.

Thus, in the IPv4 header generating section 32, the header information of the IPv4 header is generated by the IPv4 header information generating section 32a, IP_DA of the IPv4 header is generated by the IPv4 DA generating section 32b, and IP_SA of the IPv4 header is generated by the IPv4 SA generating section 32c.

As shown in FIG. 9, the IPv6 header generating section 33 includes an IPv6 header information generating section 33a, an IPv6 DA generating section 33b, and an IPv6 SA generating section 33c.

The IPv6 header information generating section 33a generates header information of the IPv6 header. The header information includes Ver., Traffic_Class, Flow_Label, Payload_Length, Next_Header, Hop_Limit, and Header_Checksum. Also, the IPv6 header information generating section 33a generates IP_SA and IP_DA of the IPv6 header.

FIG. 15 illustrates generation of the IPv6 header information.

FIG. 15 shows a table 86 explaining the manner of generating the IPv6 header information. As seen from the table 86, Ver. is expressed by 4 bits and 0x6 indicative of IPv6 is set therefor. Traffic_Class is expressed by 8 bits and 0x00 is set therefor. Flow_Label is expressed by 20 bits and 0x00000 is set therefor. Payload_Length represents the payload length and is expressed by 16 bits. Next_Header is expressed by 8 bits and 0x11 is set therefor. Hop_Limit is expressed by 8 bits and 0xFF is set therefor. The Payload_Length value is calculated by hardware. The other values of the IPv6 header information are set in hardware as fixed values, for example.

The IPv6 DA generating section 33b generates IP_DA of the IPv6 header. In this case, the IPv6 DA generating section 33b generates a fixed value or cyclic value as IP_DA in accordance with the data set in the register section 39. The data set in the register section 39 is entered by the tester through the console 11.

FIG. 16 illustrates generation of IPv6 IP_DA.

FIG. 16 shows a table 87 explaining the manner of generating a fixed value and a cyclic value, both as IP_DA. As seen from the table 87, IP_DA is expressed by 128 bits regardless of whether it is a fixed value or a cyclic value.

Where IP_DA is fixed, the IPv6 DA generating section 33b can generate a plurality of fixed IP_DA values. In this case, the IPv6 DA generating section 33b generates fixed IP_DA values in accordance with values set in the register section 39. Where a cyclic value is generated as IP_DA, the IPv6 DA generating section 33b generates a cyclic value by incrementing IP_DA within the range shown in the cell associated with "Cyclic value" in the table 87.

The IPv6 SA generating section 33c generates IP_SA of the IPv6 header. In accordance with the data set in the register section 39, the IPv6 SA generating section 33c generates a fixed value or cyclic value as IP_SA. The data set in the register section 39 is entered by the tester through the console 11.

IP_SA is expressed by 128 bits. Where IP_SA is fixed, the IPv6 SA generating section 33c can generate a plurality of fixed IP_SA values. In this case, the IPv6 SA generating section 33c generates fixed IP_SA values in accordance with values set in the register section 39. Where a cyclic value is generated as IP_SA, the IPv6 SA generating section 33c generates a cyclic value by incrementing IP_SA within the same range as shown in the cell associated with "Cyclic value" in the table 87.

The UDP header generating section 34 appearing in FIG. 9 generates the UDP header. The information contained in the UDP header is the same regardless of whether the IP header is for IPv4 or IPv6.

FIG. 17 illustrates generation of the UDP header.

FIG. 17 shows a table 88 explaining the manner of generating the UDP header. As seen from the table 88, Source_Port_No. of the UDP header is expressed by 16 bits and 0x0000 is set therefor. Destination_Port_No. is expressed by 16 bits and 0x0000 is set therefor. Length is expressed by 8 bits and represents the length of the UDP header and UDP datagram. Checksum is expressed by 16 bits and 0x0000 is set therefor. The Length value is calculated by hardware, and the other values in the UDP header are set in hardware as fixed values, for example. The value 0x0000 is set for Checksum because the UDP datagram is data for testing and thus the reliability thereof need not be guaranteed. In this manner, the UDP header is generated by the UDP header generating section 34.

As shown in FIG. 9, the UDP datagram generating section 35 includes a sequential number generating section 35a, a check data pattern generating section 35b, and an error inserting section 35c.

The sequential number generating section 35a generates PN_PADDING of which all the 16 bits are 0 (zero), PN_ID indicating that the check data pattern is test data, PN_LENGTH indicating the length of the check data pattern, and PN_SEQ which is a sequential number.

FIG. 18 illustrates generation of PN_ID.

FIG. 18 shows a table 89 explaining the manner of generating PN_ID. As seen from the table 89, the PN_ID value is expressed by 32 bits and reflects the data set in the register section 39. Namely, a value indicating that the UDP datagram is test data is written into the register section 39, whereby PN_ID indicates that the check data pattern in the UDP datagram is test data.

Figure 19:
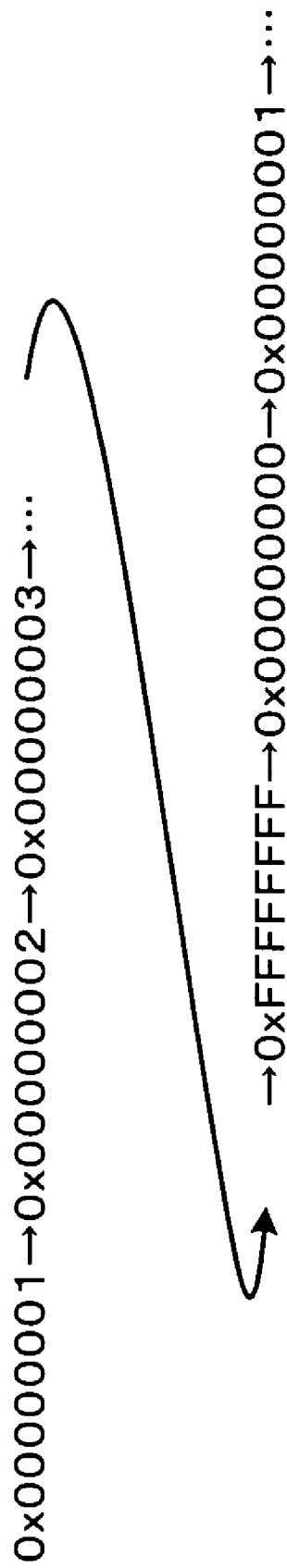
FIG. 19 illustrates generation of PN_SEQ.

FIG. 19 illustrates generation of PN_SEQ.

As shown in FIG. 19, PN_SEQ is expressed by 32 bits. PN_SEQ is generated by successively adding 1 to 0x00000000. Accordingly, PN_SEQ changes from 0xFFFFFFFF to 0x00000000, for example, and is successively incremented thereafter by 1 at a time.

The check data pattern generating section 35*b* generates a check data pattern as the test data. In accordance with the data set in the register section 39, the check data pattern generating section 35*b* generates a check data pattern of a fixed value, a check data pattern which is successively incremented by 1, or a check data pattern with a random value.

Figure 20:
FIG. 20 is a chart illustrating generation of check data patterns.

FIG. 20 illustrates generation of such check data patterns.

FIG. 20 shows a table 90 explaining the manner of how the check data patterns are generated. As seen from the table 90, where the check data pattern of a fixed value is to be generated, the check data pattern generating section 35*b* generates a 32-bit value specified by the register section 39 as the check data pattern. The data specified in the register section 39 is entered by the tester through the console 11.

Where the check data pattern is to be incremented, the check data pattern generating section 35*b* repeatedly increments the check data pattern within the range set in the register section 39. The range within which the check data pattern can be repeatedly incremented is from 0x00000000 to 0xFFFFFFFF. The data set in the register section 39 is entered by the tester through the console 11.

In the case where a random check data pattern is to be generated, the check data pattern generating section 35*b* generates a random check data pattern (PN pattern) according to a generator polynomial for generating PN patterns. The generator polynomial is, for example, X31+X28+1, and the initial value is 0xFFFFFFFF. When the random check data pattern is to assume all 0s, the initial value is used instead. The check data pattern generating section 35*b* generates a random check data pattern by 32-bit parallel processing.

The error inserting section 35*c* adds, to the generated check data pattern, data that causes an error. This makes it possible to confirm whether the IPv4 /IPv6 dual-stack frame inspecting section 40 correctly detects the error or not.

FIG. 21 illustrates the error insertion.

FIG. 21 shows a table 91 explaining the manner of inserting such an error. In accordance with the data set in the register section 39, the error inserting section 35*c* inserts a bit error in the generated check data pattern. The error insertion position is at the most significant bit (bit 31) of the first word. Also, in accordance with the data set in the register section 39, the error inserting section 35*c* attaches the sequential number to the data frame by skipping over one number. Further, in accordance with the data set in the register section 39, the error inserting section 35*c* attaches the sequential number such that the same sequential number is attached to two consecutive data frames.

Thus, in the UDP datagram generating section 35, PN_PADDING, PN_ID, PN_LENGTH and PN_SEQ (sequential number) of the UDP datagram are generated by the sequential number generating section 35*a*, a check data pattern is generated by the check data pattern generating section 35*b*, and error is inserted in the check data pattern by the error inserting section 35*c*.

As shown in FIG. 9, the load factor adjusting section 36 includes an IPv4 frame adjusting section 36*a* and an IPv6 frame adjusting section 36*b*.

In accordance with the data set in the register section 39, the IPv4 frame adjusting section 36*a* and the IPv6 frame adjusting section 36*b* determine the overall load factor of IPv4 and IPv6 data frames to be generated by the dual-stack frame multiplexing section 38. Also, in accordance with the data set in the register section 39, the IPv4 and IPv6 frame adjusting sections 36*a* and 36*b* determine the ratio of generation of IPv4 data frames to IPv6 data frames. The generation ratio is set to a fixed value or random value in accordance with the data set in the register section 39.

FIG. 22 illustrates the generation ratio setting.

FIG. 22 shows a table 92 explaining the manner of setting the generation ratio. In accordance with the data set in the register section 39, the IPv4 frame adjusting section 36*a* and the IPv6 frame adjusting section 36*b* determine the load factor as well as the IPv4-to-IPv6 generation ratio. For example, in accordance with the data set in the register section 39, the IPv4 and IPv6 frame adjusting sections 36*a* and 36*b* set 50% as the load factor and 40%:60% as the generation ratio of IPv4 data frames to IPv6 data frames.

The IPv4 and IPv6 frame adjusting sections 36*a* and 36*b* can randomize the generation ratio in accordance with the data set in the register section 39. In this case, the IPv4 and IPv6 frame adjusting sections 36*a* and 36*b* randomly generate IPv4 and IPv6 data frames so as to satisfy the determined load factor.

Thus, in the load factor adjusting section 36, the load factor of data frames and the generation ratio of IPv4 data frames to IPv6 data frames are determined by the IPv4 frame adjusting section 36*a* and the IPv6 frame adjusting section 36*b*.

As shown in FIG. 9, the frame length adjusting section 37 includes an IPv4 frame length adjusting section 37*a* and an IPv6 frame length adjusting section 37*b*.

In accordance with the data set in the register section 39, the IPv4 and IPv6 frame length adjusting sections 37*a* and 37*b* determine whether the data frames to be generated should have a fixed frame length or a random frame length. Where the data frames should have a fixed frame length, the IPv4 frame length adjusting section 37*a* determines, in accordance with the data set in the register section 39, the frame length of IPv4 data frames to be generated by the dual-stack frame multiplexing section 38. Also, the IPv6 frame length adjusting section 37*b* determines, in accordance with the data set in the register section 39, the frame length of IPv6 data frames to be generated by the dual-stack frame multiplexing section 38.

FIG. 23 illustrates the frame length adjustment.

FIG. 23 shows a table 93 explaining the manner of adjusting the frame length. In the case where data frames with a fixed frame length are to be generated, the IPv4 and IPv6 frame length adjusting sections 37*a* and 37*b* determine respective frame lengths in accordance with the data set in the register section 39. For example, the IPv4 frame length adjusting section 37*a* determines 64 bytes as the frame length of IPv4 data frames to be generated by the dual-stack frame multiplexing section 38. The IPv6 frame length adjusting section 37*b* determines 1518 bytes as the frame length of IPv6 data frames to be generated by the dual-stack frame multiplexing section 38.

Where data frames with a random frame length are to be generated, the IPv4 and IPv6 frame length adjusting sections 37*a* and 37*b* determine the respective frame lengths such that the generated data frames have random frame lengths.

Thus, in the frame length adjusting section 37, the frame lengths of the respective data frames are determined by the IPv4 and IPv6 frame length adjusting sections 37a and 37b.

The dual-stack frame multiplexing section 38 appearing in FIG. 9 assembles the headers and data generated by the individual sections, to generate, one by one, the data frames shown in FIGS. 4 to 7. In this case, the dual-stack frame multiplexing section 38 generates IPv4 and IPv6 data frames at random but within a range such that the load factor and generation ratio specified by the load factor adjusting section 36 are fulfilled. Also, the generated IPv4 and IPv6 data frames have the respective frame lengths as specified by the frame length adjusting section 37.

The dual-stack frame multiplexing section 38 attaches the sequential numbers generated by the sequential number generating section 35a and the check data patterns generated by the check data pattern generating section 35b to the IPv4 and IPv6 data frames. At this time, the dual-stack frame multiplexing section 38 attaches the sequential numbers and the check data patterns in order of generation of the IPv4 and IPv6 data frames. Accordingly, the sequential numbers are serially attached to both of IPv4 and IPv6 data frames, so that the order of generation of the IPv4 and IPv6 data frames coincides with the sequential numbers.

The IPv4/IPv6 dual-stack frame inspecting section 40 appearing in FIG. 8 will be now described in detail.

Figure 24:
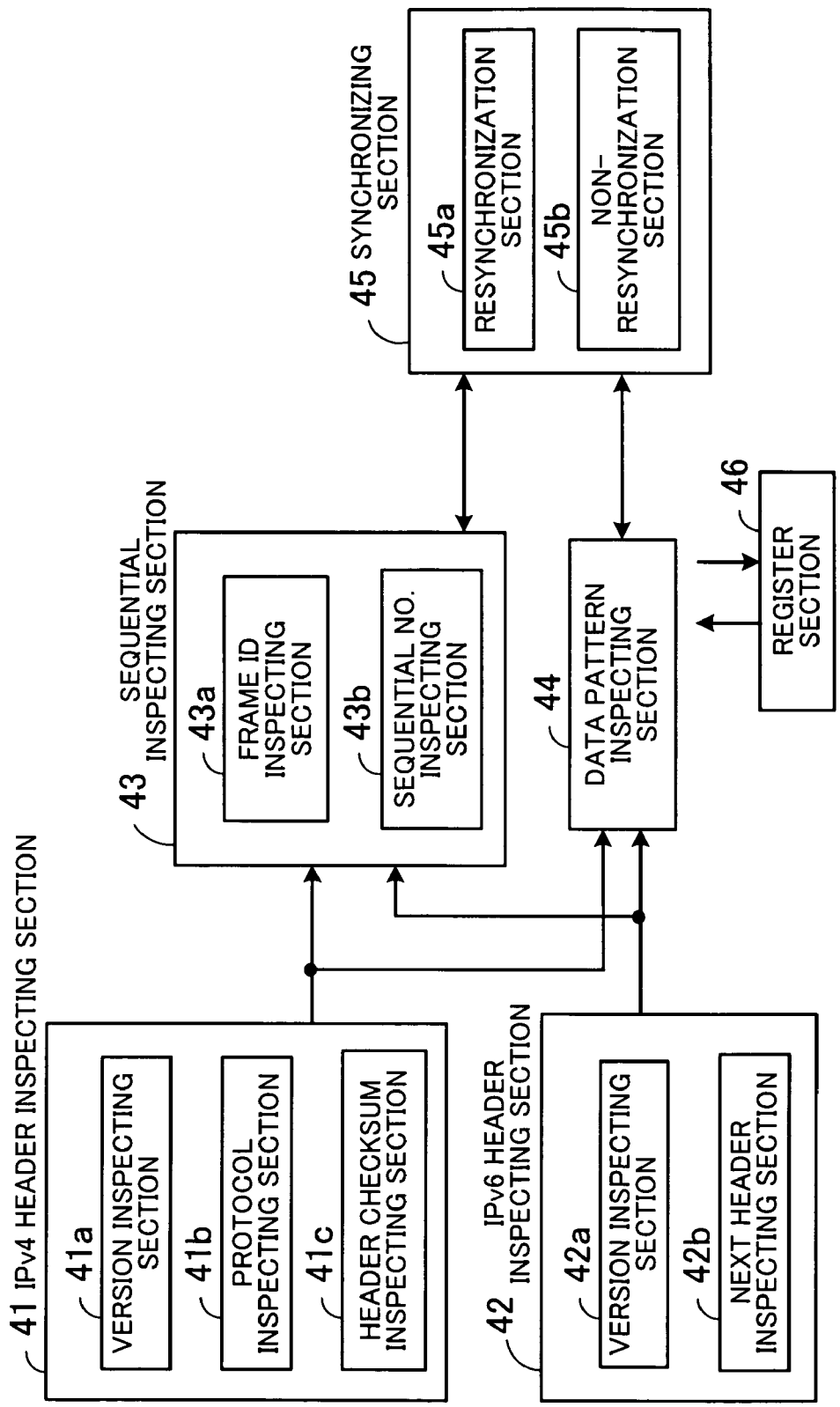
FIG. 24 is a detailed functional block diagram of an IPv4/IPv6 dual-stack frame inspecting section appearing in FIG. 8.

FIG. 24 is a detailed functional block diagram of the IPv4/IPv6 dual-stack frame inspecting section appearing in FIG. 8.

As shown in FIG. 24, the IPv4 header inspecting section 41 includes a version inspecting section 41a, a protocol inspecting section 41b, and a header checksum inspecting section 41c.

The version inspecting section 41a inspects the MAC header of the received data frame to determine whether Frame_Type in the header is 0x0800 or not. If Frame_Type is 0x0800, the version inspecting section 41a inspects the version of the IPv4 header.

FIG. 25 illustrates the version inspection for the IPv4 header.

FIG. 25 shows a table 94 explaining the version inspection for the IPv4 header. The version inspecting section 41a compares IP_Ver. in the IPv4 header of the received data frame with the expected value (0x4: version 4). If IP_Ver. in the IPv4 header disagrees with the expected value, the version inspecting section 41a discards the data frame, judging that the data frame is not a target of inspection. Also, the version inspecting section 41a writes the IP version error in the register section 46.

The protocol inspecting section 41b inspects the protocol type of the IPv4 header. Specifically, the protocol inspecting section 41b determines whether the protocol of the higher layer is UDP or not.

FIG. 26 illustrates the protocol type inspection for the IPv4 header.

FIG. 26 shows a table 95 explaining the protocol type inspection for the IP header. The protocol inspecting section 41b compares Protocol in the IPv4 header of the received data frame with the expected value (0x11:UDP). If Protocol in the IPv4 header disagrees with the expected value, the protocol inspecting section 41b discards the data frame, judging that the data frame is not a target of inspection. Also, the protocol inspecting section 41b writes the protocol type error in the register section 46.

The header checksum inspecting section 41c inspects Header_Checksum of the IPv4 header. Specifically, the header checksum inspecting section 41c calculates the checksum in the IPv4 header and compares the calculated value with Header_Checksum in the IPv4 header.

FIG. 27 illustrates the checksum inspection for the IPv4 header.

FIG. 27 shows a table 96 explaining the checksum inspection for the IPv4 header. The header checksum inspecting section 41c calculates the checksum in the IPv4 header and compares the calculated value with Header_Checksum in the IPv4 header. If the calculated checksum does not coincide with Header_Checksum in the IPv4 header, the header checksum inspecting section 41c discards the received data frame. Also, the header checksum inspecting section 41c writes the Header_Checksum error in the register section 46.

Thus, in the IPv4 header inspecting section 41, the version of the IPv4 header of the received data frame is inspected by the version inspecting section 41a. If the version of the IPv4 header is not version 4, it is judged that the received data frame is not a target of inspection and thus the data frame is discarded. Then, the higher-level protocol is inspected by the protocol inspecting section 41b, and if the higher-level protocol is not UDP, it is judged that the received data frame is not a target of inspection and thus the data frame is discarded. Subsequently, the checksum of the IPv4 header is calculated by the header checksum inspecting section 41c, and if the calculated checksum differs from the Header_Checksum value, it is judged that the received data frame is not a target of inspection and thus the data frame is discarded.

The CPU 10b reads out various errors written in the register section 46 and notifies the console 11 of the errors, whereby the tester can be informed of the occurrence of the various errors in the repeater.

As shown in FIG. 24, the IPv6 header inspecting section 42 includes a version inspecting section 42a and a next header inspecting section 42b.

The version inspecting section 42a inspects the MAC header of the received data frame to determine whether Frame_Type in the header is 0x86DD or not. If Frame_Type is 0x86DD, the version inspecting section 42a inspects the version of the IPv6 header.

FIG. 28 illustrates the version inspection for the IPv6 header.

FIG. 28 shows a table 97 explaining the version inspection for the IPv6 header. The version inspecting section 42a compares Ver. in the IPv6 header of the received data frame with the expected value (0x6:version 6). If Ver. in the IPv6 header disagrees with the expected value, the version inspecting section 42a discards the data frame, judging that the data frame is not a target of inspection. Also, the version inspecting section 42a writes the IP version error in the register section 46.

The next header inspecting section 42b inspects Next_Header of the IPv6 header. Specifically, the next header inspecting section 42b checks Next_Header to determine whether the protocol of the data following the IP header is UDP or not.

FIG. 29 illustrates the Next_Header inspection for the IPv6 header.

FIG. 29 shows a table 98 explaining the Next_Header inspection for the IP header. The next header inspecting section 42b compares Next_Header in the IPv6 header of the received data frame with the expected value (0x11: UDP). If Next_Header in the IPv6 header disagrees with the expected value, the next header inspecting section 42b discards the data frame, judging that the data frame is not a target of inspection. Also, the next header inspecting section 42b writes the protocol type error in the register section 46.

Thus, in the IPv6 header inspecting section 42, the version of the IPv6 header of the received data frame is inspected by the version inspecting section 42a. If the version of the IPv6 header is not version 6, it is judged that the received data frame is not a target of inspection and thus the data frame is discarded. Then, the higher-level protocol is inspected by the next header inspecting section 42b, and if the higher-level protocol is not UDP, it is judged that the received data frame is not a target of inspection and thus the data frame is discarded.

As shown in FIG. 24, the sequential inspecting section 43 includes a frame ID inspecting section 43a and a sequential number inspecting section 43b.

The frame ID inspecting section 43a inspects PN_ID in the UDP datagram of the received data frame. Specifically, the frame ID inspecting section 43a determines whether or not PN_ID in the UDP datagram coincides with PN_ID generated by the sequential number generating section 35a.

FIG. 30 illustrates the PN_ID inspection for the UDP datagram.

FIG. 30 shows a table 99 explaining the PN_ID inspection for the UDP datagram. The frame ID inspecting section 43a compares PN_ID in the UDP datagram of the received data frame with PN_ID (expected value) generated by the sequential number generating section 35a. If PN_ID of the received data frame disagrees with the expected value, the frame ID inspecting section 43a discards the received data frame, judging that the check data pattern in the UDP datagram is not test data. Also, the frame ID inspecting section 43a writes the frame ID error in the register section 46.

The sequential number inspecting section 43b determines whether or not the data frame has been received in order of the sequential numbers, to thereby inspect continuity of the IPv4 and IPv6 data frames being received.

FIG. 31 illustrates the continuity inspection for the data frames.

FIG. 31 shows a table 100 explaining the data frame continuity inspection. The sequential number inspecting section 43b compares the sequential number of the received data frame with an expected value of sequential number. Specifically, the sequential number inspecting section 43b generates an expected value identical with the sequential number generated by the sequential number generating section 35a.

If the sequential number of the received data frame disagrees with the expected value, the sequential number inspecting section 43b discards the received data frame, judging that the check data pattern contained therein is not a target of inspection. Also, the sequential number inspecting section 43b writes the sequence error in the register section 46. If the sequential number disagrees with the expected value and at the same time the same sequential number has been received consecutively, the frame duplication error is written into the register section 46.

The CPU 10b reads out various errors written in the register section 46 and sends the read errors to the console 11, whereupon the console 11 displays the received various errors on the display thereof. This permits the tester to be informed of the occurrence of the various errors in the repeater.

Figure 32:
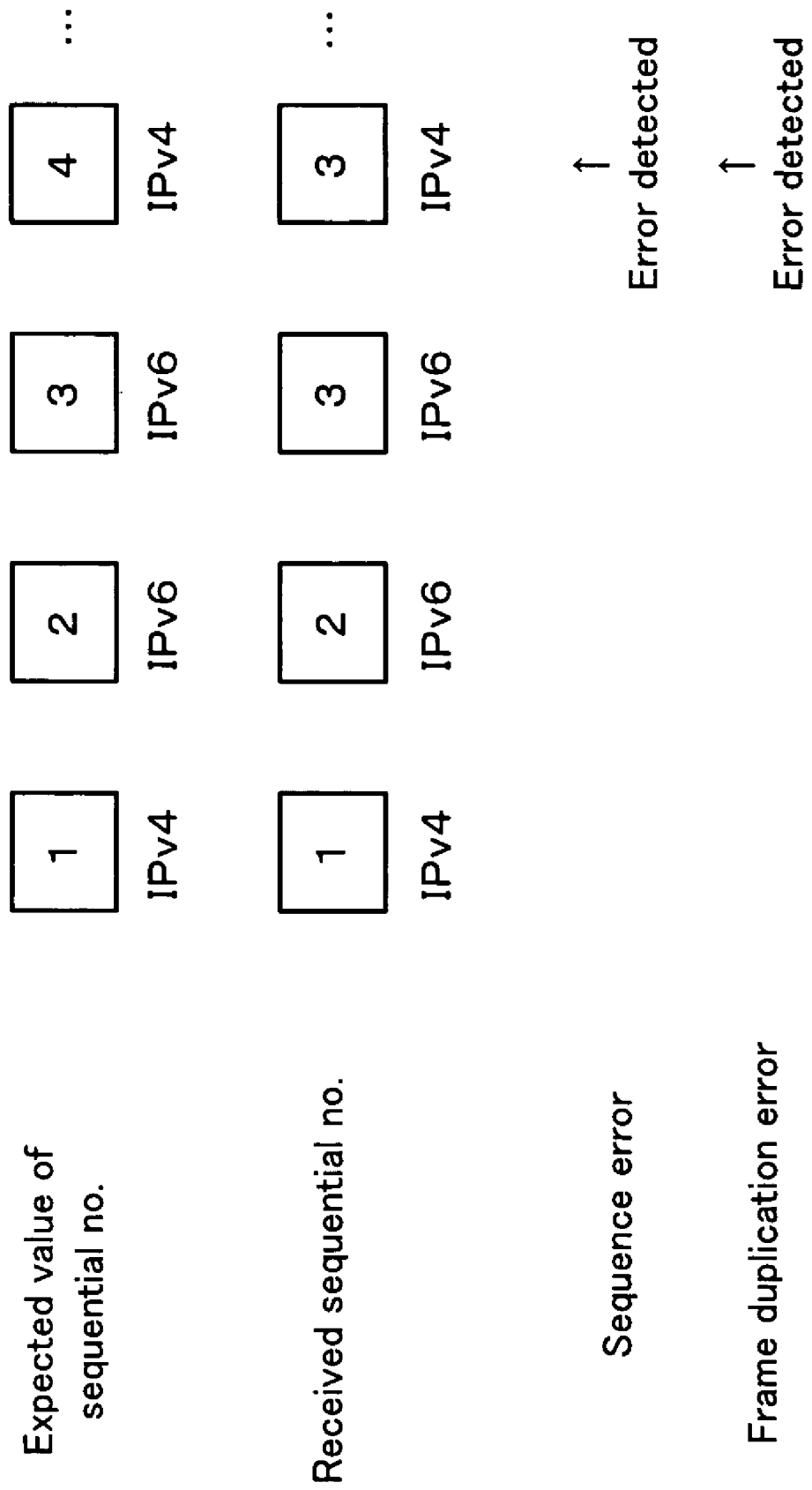
FIG. 32 is a chart illustrating an example of sequential error detection.

FIG. 32 illustrates an example of sequential error detection.

As shown in FIG. 32, the expected values of sequential numbers are 1, 2, 3, 4, . . . . Let it be assumed that the data frames received in order of IPv4, IPv6, IPv6, IPv4, . . . had the sequential numbers 1, 2, 3, 3, . . . . In this case, the sequential number of the fourth data frame is 3, which should correctly be 4. Also, the sequential number 3 is repeated. In this instance, therefore, the sequential number inspecting section 43b detects the sequence error and the frame duplication error.

Thus, in the sequential inspecting section 43, the received data frame is inspected by the frame ID inspecting section 43a to determine whether the check data pattern contained therein is test data or not. Then, continuity of the received data frames is inspected by the sequential number inspecting section 43b.

The data pattern inspecting section 44 appearing in FIG. 24 compares the check data pattern of the received data frame with an expected value. The expected value is identical with the check data pattern generated by the check data pattern generating section 35b.

FIG. 33 illustrates the check data pattern inspection.

FIG. 33 shows a table 101 explaining the check data pattern inspection. In the case where the check data pattern generating section 35b is generating a random check data pattern, the data pattern inspecting section 44 generates an expected value by using the same generator polynomial as that used by the check data pattern generating section 35b to generate PN pattern. Then, the data pattern inspecting section 44 compares the expected value thus generated with the check data pattern of the received data frame. If the expected value disagrees with the check data pattern of the received data frame, the data pattern inspecting section 44 writes the PN pattern bit error in the register section 46. In the example shown in FIG. 20, the check data pattern generating section 35b uses $X31+X28+1$ as the generator polynomial. Accordingly, in this case, the data pattern inspecting section 44 generates the expected value by using the generator polynomial $X31+X28+1$.

Where the check data pattern generating section 35b is generating a fixed check data pattern, the data pattern inspecting section 44 generates, as the expected value, a value equal to the fixed value generated by the check data pattern generating section 35b. Then, the data pattern inspecting section 44 compares the thus-generated expected value with the check data pattern of the received data frame. If the expected value disagrees with the check data pattern of the received data frame, the data pattern inspecting section 44 writes the fixed data pattern bit error in the register section 46.

In the case where the check data pattern generating section 35b is generating an incremental check data pattern, the data pattern inspecting section 44 generates, as the expected value, an incremental check data pattern identical with that generated by the check data pattern generating section 35b. Then, the data pattern inspecting section 44 compares the thus-generated expected value with the check data pattern of the received data frame. If the expected value disagrees with the check data pattern of the received data frame, the data pattern inspecting section 44 writes the incremental data pattern bit error in the register section 46.

The data pattern inspecting section 44 determines, in accordance with the data set in the register section 46, the type of expected value to be generated. The type of check data pattern generated by the check data pattern generating section 35b is previously set in the register section 46.

The CPU 10b reads out various errors written in the register section 46 and sends the read errors to the console 11, whereupon the console 11 displays the received various errors on the display thereof. Thus, the tester can be informed of the occurrence of the various errors in the repeater.

In this manner, the bits constituting the check data pattern of the received data frame are inspected by the data pattern inspecting section 44.

As shown in FIG. 24, the synchronizing section 45 includes a resynchronization section 45a and a non-resynchronization section 45b.

When the sequential number of the received data frame disagrees with the expected value, the resynchronization section 45a controls the sequential number inspecting section 43b such that the expected values are generated thereafter starting from the value subsequent to the disagreeing sequential number. Alternatively, the synchronizing section 45 forcibly inspects the data frames without performing the resynchronization process. The synchronizing section 45 carries out the resynchronization process or the non-resynchronization process in accordance with the data set in the register section 46.

Figure 34:
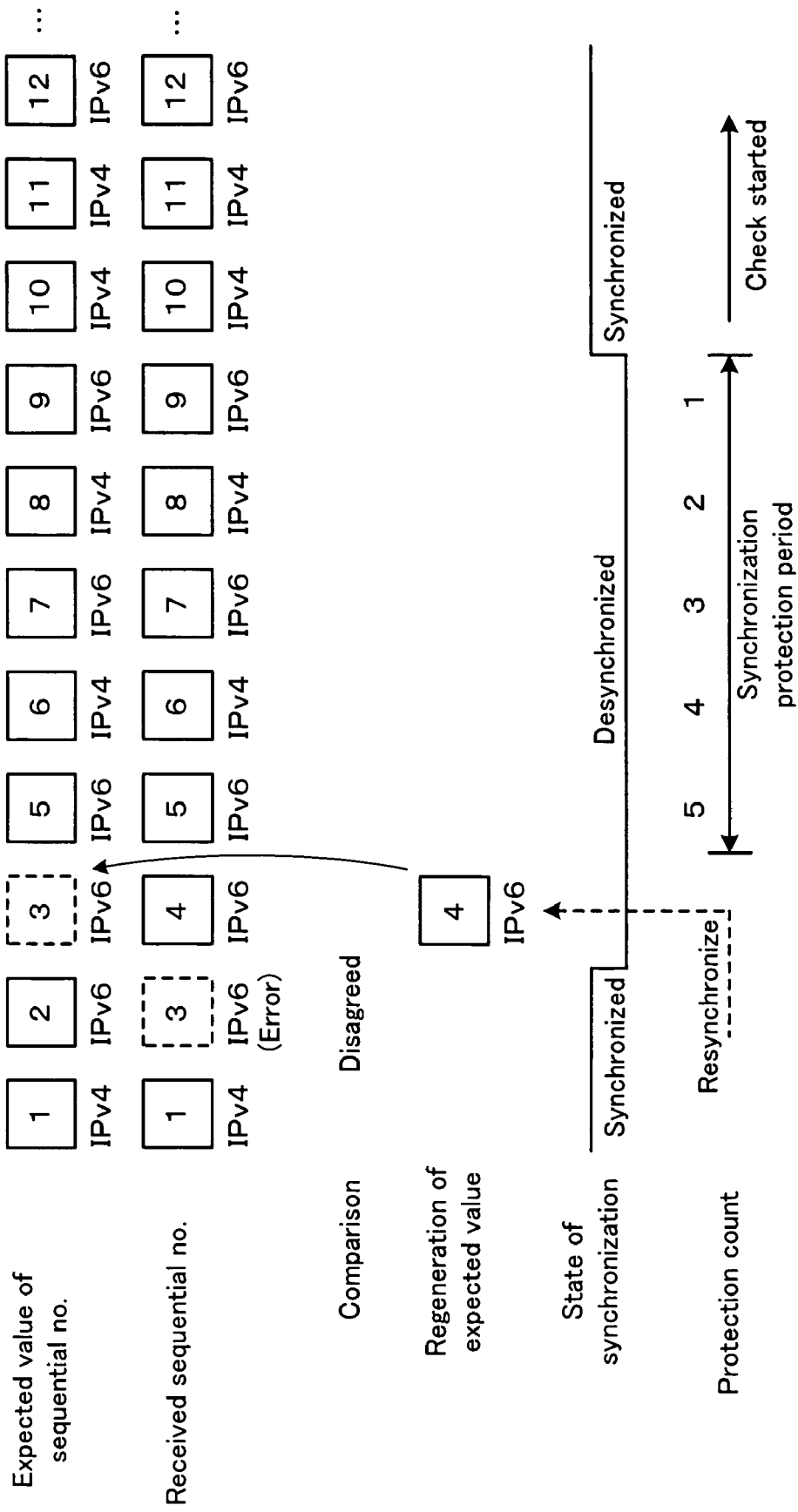
FIG. 34 is a chart illustrating a resynchronization process.

FIG. 34 illustrates the resynchronization process.

In FIG. 34, the data frames are received in order of the sequential numbers 1, 3, 4, 5, 6, 7, 8, 9, 10, 11, 12, . . . . The data frame with the sequential number 3 is received in the place where the data frame with the sequential number 2 should originally be received, causing an error. The sequential number inspecting section 43b normally generates the expected value 3 after the expected value 2, but in this case, the resynchronization section 45a controls the sequential number inspecting section 43b so as to generate the expected value 4, which is the number subsequent to the erroneous sequential number 3.

After the occurrence of the error, the resynchronization section 45a desynchronizes the inspection (sequential number error is prevented from being written into the register section 46). Following the elimination of the error by the resynchronization process, the resynchronization section 45a establishes synchronization after receiving a predetermined number of data frames (synchronization protection period). The synchronization protection period is provided because once error occurs, disagreement of sequential numbers continuously takes place a plurality of times due to the nature of data frame. In FIG. 34, the synchronization protection period lasts for a period corresponding to five data frames. If an error occurs during the synchronization protection period, the resynchronization process is again performed. Thus, by performing the resynchronization process, the data frames with correct sequential numbers received after the occurrence of error are prevented from being consecutively judged erroneous.

Figure 35:
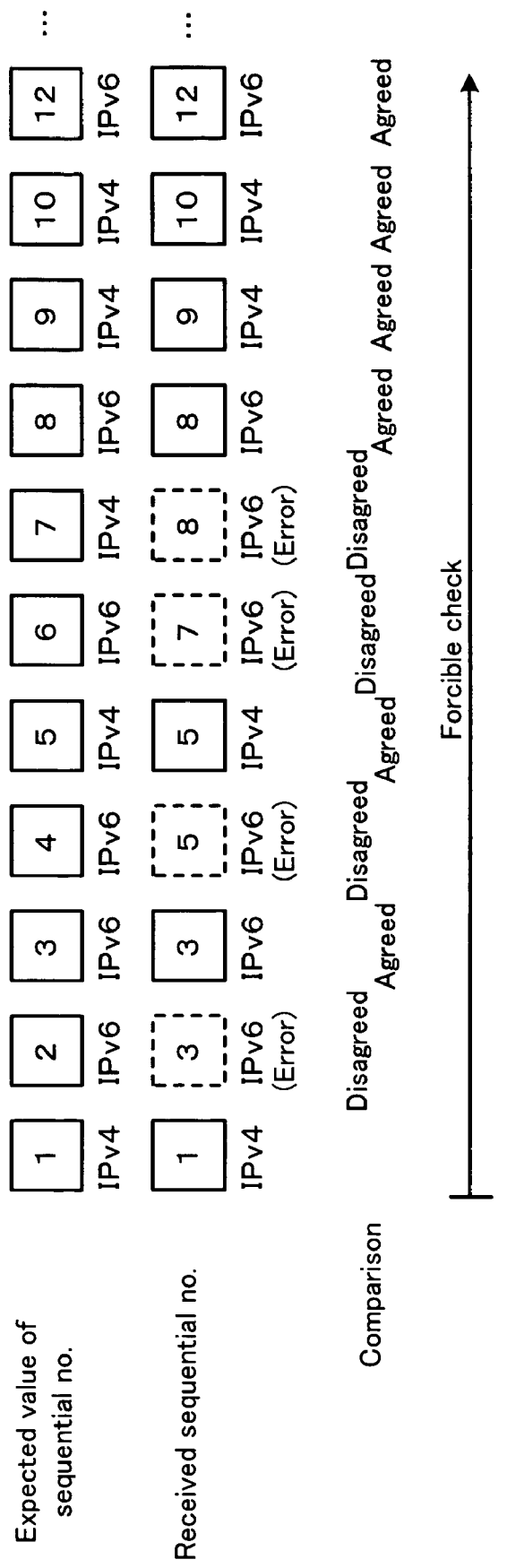
FIG. 35 is a chart illustrating a non-resynchronization process.

FIG. 35 illustrates the non-resynchronization process.

In the case where the non-resynchronization process is selected in the register section 46, the non-resynchronization section 45b controls the sequential number inspecting section 43b so as to generate expected values of sequential numbers as shown in FIG. 35. In the non-resynchronization process, the check data pattern inspection is forcibly continued without carrying out the resynchronization process. In cases where sequential number errors are numerous or test data change is serious, the resynchronization process may possibly permanently fail to establish synchronization, making it impossible to inspect the data frames. In such cases, the data frame inspection is forcibly continued by performing the non-resynchronization process.

Thus, the resynchronization section 45a in the synchronizing section 45 controls the sequential number inspecting section 43b so as to carry out the resynchronization process. The non-resynchronization section 45b controls the sequential number inspecting section 43b so as to perform the non-resynchronization process.

The frame accumulating section 50 appearing in FIG. 8 will be now described in detail.

Figure 36:
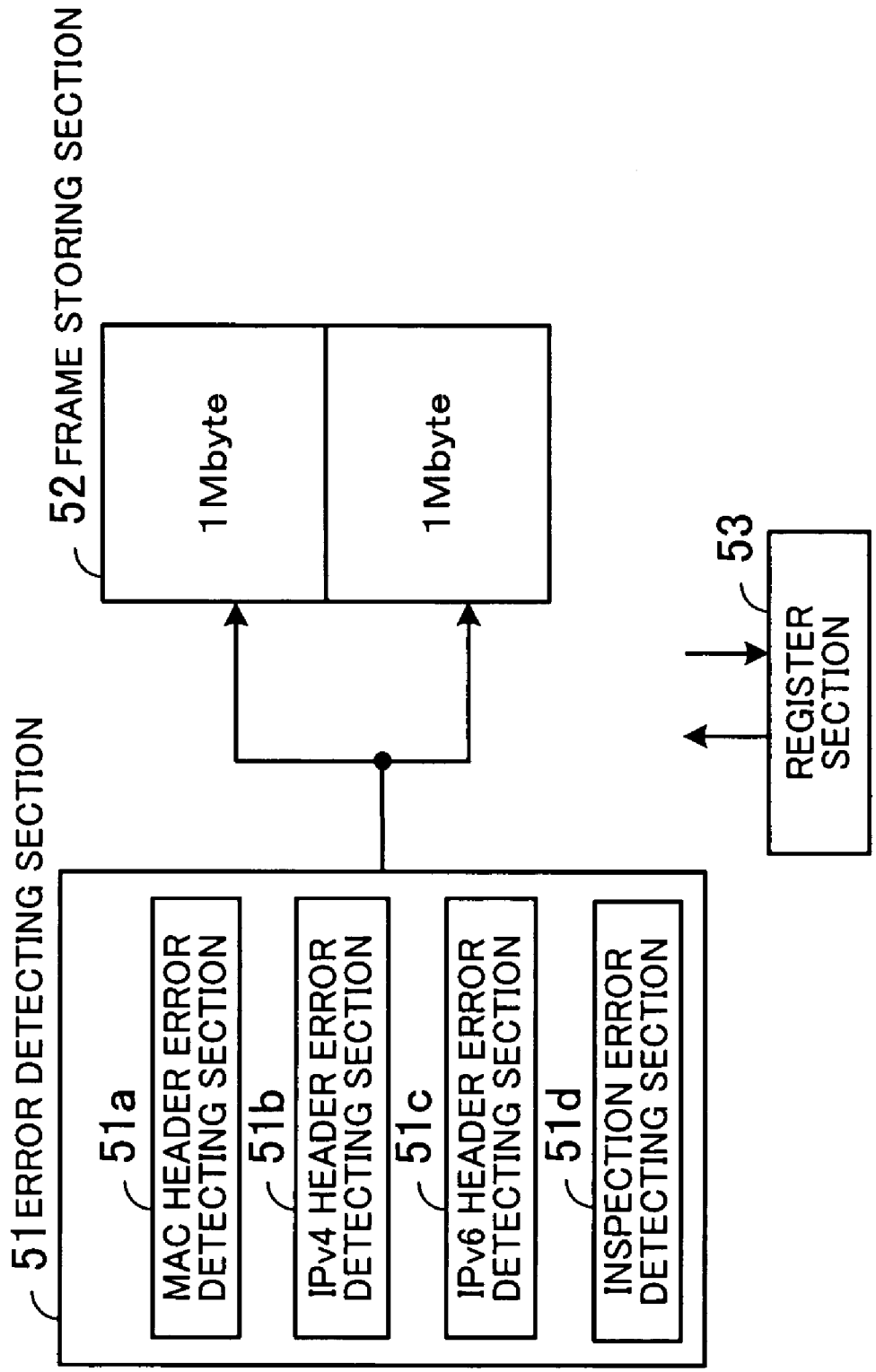
FIG. 36 is a detailed functional block diagram of a frame accumulating section appearing in FIG. 8.

FIG. 36 is a detailed functional block diagram of the frame accumulating section appearing in FIG. 8.

As shown in FIG. 36, the error detecting section 51 includes a MAC header error detecting section 51a, an IPv4 header error detecting section 51b, an IPv6 header error detecting section 51c, and an inspection error detecting section 51d.

The MAC header error detecting section 51a determines whether or not the MAC header of the received data frame is in error. The IPv4 header error detecting section 51b determines whether or not the IPv4 header of the received data frame is in error, and the IPv6 header error detecting section 51c determines whether or not the IPv6 header of the received data frame is in error. The inspection error detecting section 51d detects sequential number errors and check data pattern errors by means of the IPv4/IPv6 dual-stack frame inspecting section 40. The error detecting section 51 stores data frames in the frame storing section 52 by FIFO (First In First Out) method. On detection of an error, the individual sections of the error detecting section 51 keep storing a predetermined number of data frames thereafter and then stop storing data frames. The predetermined number of data frames is equivalent, for example, to half the total capacity of the FIFO storage for storing data frames. This makes it possible to store equal amounts of data frames preceding and following the erroneous data frame.

In the example of FIG. 36, the frame storing section 52 stores 2 Mbytes of data frames. When 1 Mbyte of data frames is stored after the detection of an error, the individual sections of the error detecting section 51 stop storing data frames. This permits the frame storing section 52 to store 1 Mbyte of data frames preceding the erroneous data frame and 1 Mbyte of data frames following the erroneous data frame (if a data frame is about 10 Kbytes, approximately 100 data frames preceding the erroneous data frame and approximately 100 data frames following the erroneous data frame are stored).

Items for which error is to be detected can be specified through the console 11. The specified error detection items are written into the register section 53. The MAC header error detecting section 51a, the IPv4 header error detecting section 51b and the IPv6 header error detecting section 51c look up the register section 53 to identify the items for which error should be detected.

Figure 37:
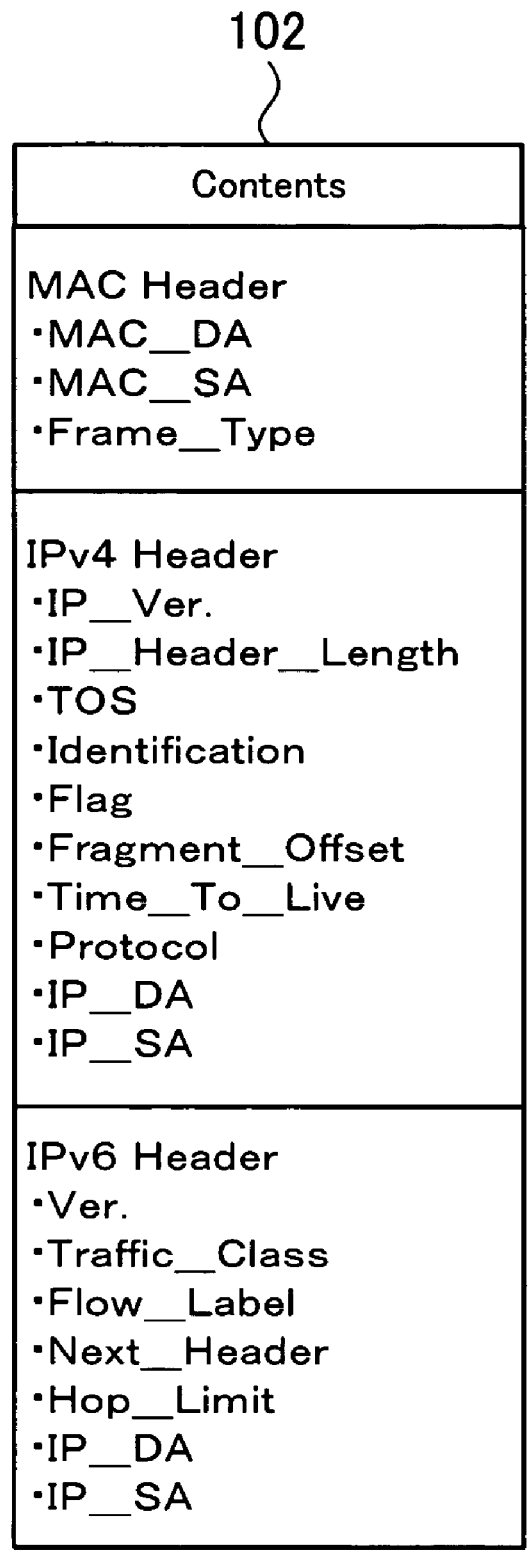
FIG. 37 is a first chart illustrating error detection items.

FIG. 37 is a first chart illustrating the error detection items.

FIG. 37 shows a list 102 of items of the respective headers with respect to which error is detected. In accordance with the data set in the register section 53, the MAC header error detecting section 51a detects error in MAC_DA, MAC_SA or Frame_Type of the MAC header. Also, in accordance with the data set in the register section 53, the IPv4 header error detecting section 51b detects error in IP_Ver., IP_Header_Length, TOS, Identification, Flag, Fragment_Offset, Time_To_Live, Protocol, IP_DA or IP_SA of the IPv4 header. Further, in accordance with the data set in the register section 53, the IPv6 header error detecting section 51c detects error in Ver., Traffic_Class, Flow_Label, Next_Header, Hop_Limit, IP_DA or IP_SA of the IPv6 header. The error detection is carried out by comparing the headers generated by the IPv4/IPv6 dual-stack frame generating section 30 with the respective headers of the received frame.

FIG. 38 is a second chart illustrating the error detection items.

FIG. 38 shows a list 103 of items with respect to which error is detected. The inspection error detecting section 51d detects the sequential number error and check data pattern error detected by the IPv4/IPv6 dual-stack frame inspecting section 40.

The data frames stored in the frame storing section 52 are sent to the console 11 by the CPU 10b, whereby the tester can analyze the data frames to determine which sequential number was lost or repeated. Also, the tester can analyze not only the pattern of the erroneous data frame but the patterns of data frames preceding and following the erroneous data frame.

The following describes the operations of the elements appearing in the individual functional block diagrams.

The operations of the elements appearing in the functional block diagram of FIG. 8 will be described first. The dual-stack frame multiplexing section 38 in the IPv4/IPv6 dual-stack frame generating section 30 assembles the MAC header, IPv4 header, UDP header and UDP datagram generated by the respective generating sections, to generate an IPv4 data frame. Also, the dual-stack frame multiplexing section 38 assembles the MAC header, IPv6 header, UDP header and UDP datagram generated by the respective generating sections, to generate an IPv6 data frame. In this case, the dual-stack frame multiplexing section 38 generates IPv4 and IPv6 data frames so as to satisfy the load factor and generation ratio specified by the load factor adjusting section 36 as well as the frame lengths specified by the frame length adjusting section 37.

Then, the dual-stack frame multiplexing section 38 attaches the sequential number and the check data pattern as test data, generated by the UDP datagram generating section 35, to the data frame. The sequential numbers are serially attached to both of generated IPv4 and IPv6 data frames.

The transmit MAC interface 60 transmits the IPv4 and IPv6 data frames generated by the dual-stack frame multiplexing section 38 to the repeater 12 through the line I/F 10g in order of the sequential numbers.

The receive MAC interface 70 receives the IPv4 and IPv6 data frames from the repeater 12 through the line I/F 10g. The received data frames are sent to the IPv4/IPv6 dual-stack frame inspecting section 40 and the frame accumulating section 50.

The IPv4 header inspecting section 41 in the IPv4/IPv6 dual-stack frame inspecting section 40 determines whether or not the received data frame is an IPv4 data frame and whether or not the received data frame contains the test data. Also, the IPv6 header inspecting section 42 determines whether or not the received data frame is an IPv6 data frame and whether or not the received data frame contains the test data. If it is judged that the received IPv4 or IPv6 data frame is a target of testing, the sequential inspecting section 43 determines whether or not the data frame has been received in order of the sequential numbers. Also, the data pattern inspecting section 44 determines whether or not the check data pattern has been properly transmitted/received. The synchronizing section 45 controls the sequential inspecting section 43 so as to perform the resynchronization process or the non-resynchronization process.

The error detecting section 51 stores the received data frames in the frame storing section 52 by FIFO method. Also, the error detecting section 51 detects error in the MAC header, IPv4 header and IPv6 header of the received data frames. When an error is detected, the error detecting section 51 keeps storing a predetermined number of data frames thereafter and then stops storing data frames. Further, when a sequential number error or check data pattern error is detected by the IPv4/IPv6 dual-stack frame inspecting section 40, the error detecting section 51 keeps storing the predetermined number of data frames thereafter and then stops storing data frames.

The operations of the elements appearing in the functional block diagram of FIG. 9 will be now described. The MAC DA generating section 31a in the MAC header generating section 31 generates MAC_DA of the MAC header, and the MAC SA generating section 31b generates MAC_SA of the MAC header. Where a data frame with a VLAN tag is to be generated, the VLAN Tag generating section 31c generates a VLAN tag for the MAC header. The Frame Type generating section 31d generates Frame_Type of the MAC header.

The IPv4 header information generating section 32a in the IPv4 header generating section 32 generates IPv4 header information of the IPv4 header. The IPv4 DA generating section 32b generates IP_DA of the IPv4 header, and the IPv4 SA generating section 32c generates IP_SA of the IPv4 header.

The IPv6 header information generating section 33a in the IPv6 header generating section 33 generates IPv6 header information of the IPv6 header. The IPv6 DA generating section 33b generates IP_DA of the IPv6 header, and the IPv6 SA generating section 33c generates IP_SA of the IPv6 header.

The UDP header generating section 34 generates a UDP header for IPv4 and IPv6 data frames. The UDP header generated is common to IPv4 and IPv6 data frames.

The sequential number generating section 35a in the UDP datagram generating section 35 generates a sequential number. The check data pattern generating section 35b generates a check data pattern with a fixed value, incremental value or PN pattern in accordance with the data set in the register section 39. Also, in accordance with the data set in the register section 39, the error inserting section 35c inserts, in the check data pattern, an error that causes a bit error, sequence error or duplication error.

The IPv4 frame adjusting section 36a and the IPv6 frame adjusting section 36b in the load factor adjusting section 36 determine the load factor of IPv4 and IPv6 data frames to be generated by the dual-stack frame multiplexing section 38 as well as the generation ratio of IPv4 data frames to IPv6 data frames. The IPv4 frame length adjusting section 37a and the IPv6 frame length adjusting section 37b in the frame length adjusting section 37 respectively determine whether IPv4 and IPv6 data frames to be generated by the dual-stack frame multiplexing section 38 should have a fixed frame length or random frame length.

The dual-stack frame multiplexing section 38 assembles the MAC headers, IPv4 headers, IPv6 headers, UDP headers and UDP datagrams generated by the respective sections, to generate IPv4 and IPv6 data frames. At this time, the dual-stack frame multiplexing section 38 generates IPv4 and IPv6 data frames according to the load factor and generation ratio determined by the load factor adjusting section 36. Also, IPv4 and IPv6 data frames are generated so as to have the frame lengths determined by the frame length adjusting section 37.

The operations of the elements appearing in the functional block diagram of FIG. 24 will be now described. The version inspecting section 41a in the IPv4 header inspecting section 41 determines whether the version of the received data frame is 4 or not. If the version of the received data frame is 4, the protocol inspecting section 41b determines whether the higher-level protocol is UDP or not. If the higher-level protocol is UDP, the header checksum inspecting section 41c inspects the checksum in the IPv4 header.

The version inspecting section 42a in the IPv6 header inspecting section 42 determines whether the version of the received data frame is 6 or not. If the version of the received data frame is 6, the next header inspecting section 42b determines whether the higher-level protocol is UDP or not.

The frame ID inspecting section 43a in the sequential inspecting section 43 inspects PN_ID of the received data frame. The sequential number inspecting section 43b determines whether or not the data frame has been received in order of the sequential numbers. The data pattern inspecting section 44 inspects the check data pattern of the received data frame.

In accordance with the data set in the register section 46, the synchronizing section 45 controls the sequential inspecting section 43 and the data pattern inspecting section 44 to perform the resynchronization process or the non-resynchronization process.

The operations of the elements appearing in the functional block diagram of FIG. 36 will be now described. The frame storing section 52 stores the received data frame according to FIFO scheme. The MAC header error detecting section 51*a*, the IPv4 header error detecting section 51*b* and the IPv6 header error detecting section 51*c* in the error detecting section 51 inspect the MAC header, IPv4 header and IPv6 header, respectively, of the received data frame. If an error occurs in the MAC header, IPv4 header or IPv6 header, the MAC header error detecting section 51*a*, the IPv4 header error detecting section 51*b* or the IPv6 header error detecting section 51*c* keeps storing a predetermined number of data frames thereafter and then stops storing data frames in the frame storing section 52.

The inspection error detecting section 51*d* detects a sequential number error and a check data pattern error by means of the IPv4/IPv6 dual-stack frame inspecting section 40. When a sequential number error or check data pattern error is detected, the inspection error detecting section 51*d* keeps storing the predetermined number of data frames thereafter and then stops storing data frames in the frame storing section 52.

In this manner, the sequential numbers are serially attached to both of data frames conformable to the communication protocol IPv4 and data frames conformable to the communication protocol IPv6. Also, the check data patterns are attached to the IPv4 and IPv6 data frames. The data frames are transmitted to a repeater which is a target of testing, and it is then determined whether or not the IPv4 and IPv6 data frames have been received from the repeater in order of the sequential numbers and also whether or not the check data pattern has been properly received. This makes is possible to test repeaters supporting both the communication protocols IPv4 and IPv6.

In the communication test device according to the present invention, sequential numbers are serially attached to both of first data frames conformable to a first communication protocol and second data frames conformable to a second communication protocol, and with test data also attached to the first and second data frames, the data frames are transmitted to a repeater. Then, it is determined whether or not the first and second data frames have been received from the repeater in order of the sequential numbers, and the received test data is compared with the original test data.

This makes it possible to test continuity of the first and second data frames received and transmitted by the repeater as well as reliability of data attached to the first and second data frames, whereby test can be conducted on repeaters supporting two kinds of communication protocols.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication test device for conducting a communication test on a repeater connected to networks, comprising:
    data frame generating means for randomly generating first data frames conformable to a first communication protocol and second data frames conformable to a second communication protocol;
    sequential number attaching means for attaching sequential numbers to the first and second data frames consecutively;
    test data attaching means for attaching test data to the first and second data frames;
    transmitting means for transmitting the first and second data frames to the repeater in order of the attached numbers;
    receiving means for receiving the first and second data frames from the repeater;
    sequential number judging means for determining whether or not the first and second data frames have been received in order of the numbers; and
    test data comparing means for comparing the test data attached to the received first and second data frames with the test data attached by said test data attaching means,
    wherein said data frame generating means controls a ratio of generation of the first data frames to the second data frames in accordance with an externally input instruction.

2. The communication test device according to claim 1, wherein said test data attaching means generates random test data according to a generator polynomial for generating random numerical values.

3. The communication test device according to claim 2, wherein said test data comparing means generates an expected value according to a polynomial identical with the generator polynomial, for comparison of the expected value with the test data attached to the first and second data frames.

4. The communication test device according to claim 1, wherein said sequential number judging means generates expected values of sequential numbers, for comparison of the expected values with the respective numbers attached to the first and second data frames.

5. The communication test device according to claim 4, wherein, if the number and the expected value differ from each other, said sequential number judging means generates the expected values thereafter starting from a value subsequent to the number.

6. The communication test device according to claim 1, further comprising:
    storing means for storing the received first and second data frames by FIFO method; and
    storage control means for causing said storing means to keep storing a predetermined number of the first and second data frames and then to stop storing data frames when the first and second data frames were not received in order of the numbers or when disagreement of the test data was detected by said test data comparing means.

7. The communication test device according to claim 6, further comprising storage display means for displaying the first and second data frames stored in said storing means.

8. The communication test device according to claim 1, wherein said test data attaching means selectively attaches test data with a fixed value, test data with a value incremented by one at a time, or test data with a random value in accordance with an externally input instruction.

9. The communication test device according to claim 1, further comprising result display means for displaying a determination result derived by said sequential number judging means and a comparison result derived by said test data comparing means.

10. A communication test method for conducting a communication test on a repeater connected to networks, comprising the steps of:
randomly generating first data frames conformable to a first communication protocol and second data frames conformable to a second communication protocol;
attaching sequential numbers to the first and second data frames consecutively;
attaching test data to the first and second data frames;
transmitting the first and second data frames to the repeater in order of the attached numbers;
receiving the first and second data frames from the repeater;
determining whether or not the first and second data frames have been received in order of the numbers; and
comparing the test data attached to the received first and second data frames with the test data attached in said test data attaching step,
wherein said first data frame and second data frame generating step includes controlling a ratio of generation of the first data frames to the second data frames in accordance with an externally input instruction.

11. A communication test device for conducting a communication test on a repeater connected to networks, comprising:
data frame generating means for randomly generating first data frames conformable to a first communication protocol and second data frames conformable to a second communication protocol;
sequential number attaching means for attaching sequential numbers to the first and second data frames consecutively;
test data attaching means for attaching test data to the first and second data frames;
transmitting means for transmitting the first and second data frames to the repeater in order of the attached numbers;
receiving means for receiving the first and second data frames from the repeater;
sequential number judging means for determining whether or not the first and second data frames have been received in order of the numbers; and
test data comparing means for comparing the test data attached to the received first and second data frames with the test data attached by said test data attaching means,
wherein said data frame generating means controls an overall generation rate of the first and second data frames in accordance with an externally input instruction.

12. A communication test device for conducting a communication test on a repeater connected to networks, comprising:
data frame generating means for randomly generating first data frames conformable to a first communication protocol and second data frames conformable to a second communication protocol;
sequential number attaching means for attaching sequential numbers to the first and second data frames consecutively;
test data attaching means for attaching test data to the first and second data frames;
transmitting means for transmitting the first and second data frames to the repeater in order of the attached numbers;
receiving means for receiving the first and second data frames from the repeater;
sequential number judging means for determining whether or not the first and second data frames have been received in order of the numbers; and
test data comparing means for comparing the test data attached to the received first and second data frames with the test data attached by said test data attaching means,
wherein said data frame generating means controls frame lengths of the first and second data frames in accordance with an externally input instruction.

13. A communication test method for conducting a communication test on a repeater connected to networks, comprising the steps of:
randomly generating first data frames conformable to a first communication protocol and second data frames conformable to a second communication protocol;
attaching sequential numbers to the first and second data frames consecutively;
attaching test data to the first and second data frames;
transmitting the first and second data frames to the repeater in order of the attached numbers;
receiving the first and second data frames from the repeater;
determining whether or not the first and second data frames have been received in order of the numbers; and
comparing the test data attached to the received first and second data frames with the test data attached in said test data attaching step,
wherein said first data frame and second data frame generating step includes controlling an overall generation rate of the first and second data frames in accordance with an externally input instruction.

14. A communication test method for conducting a communication test on a repeater connected to networks, comprising the steps of:
randomly generating first data frames conformable to a first communication protocol and second data frames conformable to a second communication protocol;
attaching sequential numbers to the first and second data frames consecutively;
attaching test data to the first and second data frames;
transmitting the first and second data frames to the repeater in order of the attached numbers;
receiving the first and second data frames from the repeater;
determining whether or not the first and second data frames have been received in order of the numbers; and
comparing the test data attached to the received first and second data frames with the test data attached in said test data attaching step,
wherein said first data frame and second data frame generating step includes controlling frame lengths of the first and second data frames in accordance with an externally input instruction.

* * * * *